United States Patent
Ando et al.

(10) Patent No.: US 10,948,706 B2
(45) Date of Patent: Mar. 16, 2021

(54) STAGE APPARATUS, METHOD OF CONTROLLING STAGE APPARATUS, AND MICROSCOPE SYSTEM

(71) Applicants: CANON KABUSHIKI KAISHA, Tokyo (JP); CANON PRECISION INC., Hirosaki (JP)

(72) Inventors: Hirotake Ando, Tokyo (JP); Seiyo Aizu, Tsugaru (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 15/566,844

(22) PCT Filed: Apr. 21, 2016

(86) PCT No.: PCT/JP2016/002128
§ 371 (c)(1),
(2) Date: Oct. 16, 2017

(87) PCT Pub. No.: WO2016/178306
PCT Pub. Date: Nov. 10, 2016

(65) Prior Publication Data
US 2018/0136447 A1 May 17, 2018

(30) Foreign Application Priority Data

May 1, 2015 (JP) .................................. 2015-094443
May 1, 2015 (JP) .............................. JP2015-094441

(51) Int. Cl.
*G02B 21/26* (2006.01)
*G01D 5/347* (2006.01)
(Continued)

(52) U.S. Cl.
CPC ............ *G02B 21/26* (2013.01); *G01B 5/0004* (2013.01); *G01D 5/347* (2013.01); *H04N 5/2253* (2013.01)

(58) Field of Classification Search
CPC ........ G02B 21/26; G02B 21/34; G02B 21/00; G02B 21/364; G02B 21/362;
(Continued)

(56) References Cited

U.S. PATENT DOCUMENTS 9,182,582 B2 11/2015 Inoue
2007/0057196 A1* 3/2007 Matsushima ........... H01J 37/20
250/442.11
(Continued)

FOREIGN PATENT DOCUMENTS

EP 2 224 274 9/2010
JP 62-97004 5/1987
(Continued)

OTHER PUBLICATIONS

Japanese Office Action dated Jan. 8, 2018 during prosecution of related Japanese application No. 2015-094443. (English-language machine translation included.).
(Continued)

*Primary Examiner* — Stephone B Allen
*Assistant Examiner* — Rahman Abdur
(74) *Attorney, Agent, or Firm* — Venable LLP

(57) ABSTRACT

A stage apparatus comprises an incremental scale fixed to a movable unit and having a predetermined length shorter than a distance the movable unit can move in a first direction, a first and a second sensor that are arranged in the first direction with an interval therebetween shorter than the predetermined length, and a detection unit that detects an origin point position set in a movable range of the movable unit. In an origin return, if the movable unit is at a position
(Continued)

at which both the first sensor and the second sensor can read the scale, the apparatus moves the movable unit to the origin point position by a predetermined distance, then moves the movable unit at a lower speed until the origin point position is detected.

14 Claims, 21 Drawing Sheets

(51) Int. Cl.
*G01B 5/00* (2006.01)
*H04N 5/225* (2006.01)

(58) Field of Classification Search
CPC .... G02B 21/0008; G02B 21/24; G02B 21/32; G02B 21/241; H04N 5/2253; G01D 5/347; G01B 5/0004; G01B 9/04
USPC .......................................... 359/368, 391–393
See application file for complete search history.

(56) References Cited

U.S. PATENT DOCUMENTS

| 2008/0040942 | A1 | 2/2008 | Eales | |
| 2010/0073672 | A1* | 3/2010 | McMurtry | G02B 21/26 356/244 |
| 2010/0188743 | A1* | 7/2010 | Inoue | G02B 21/26 359/393 |
| 2011/0218760 | A1* | 9/2011 | Takahama | G01P 3/64 702/150 |

FOREIGN PATENT DOCUMENTS

| JP | 8-69326 | 3/1996 |
| JP | 11-170122 | 6/1999 |
| JP | 2000-56834 | 2/2000 |
| JP | 2003-161893 | 6/2003 |

OTHER PUBLICATIONS

European Office Action dated Nov. 21, 2019 during prosecution of related European application No. 16722715.6.

* cited by examiner

[Fig. 1]
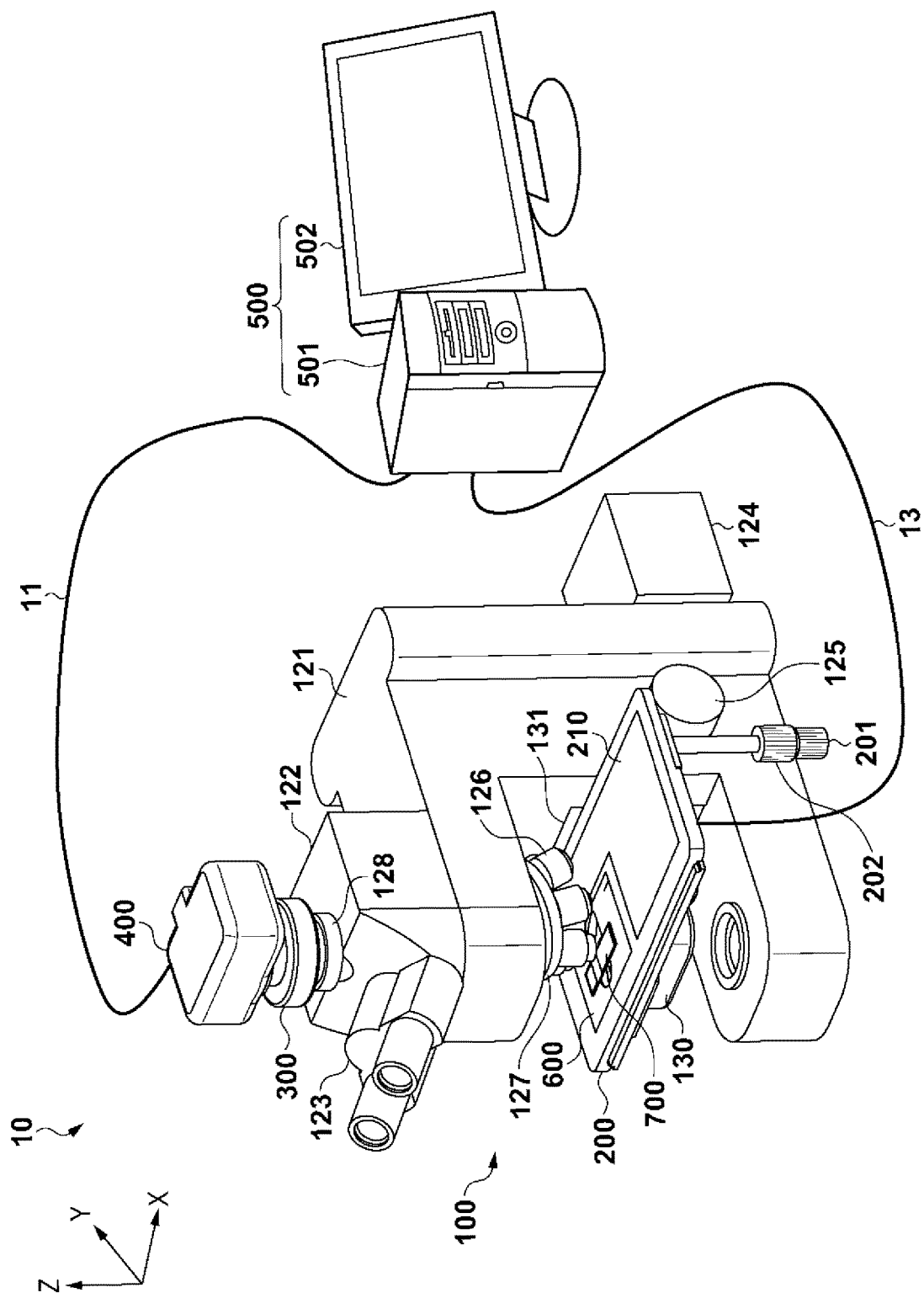

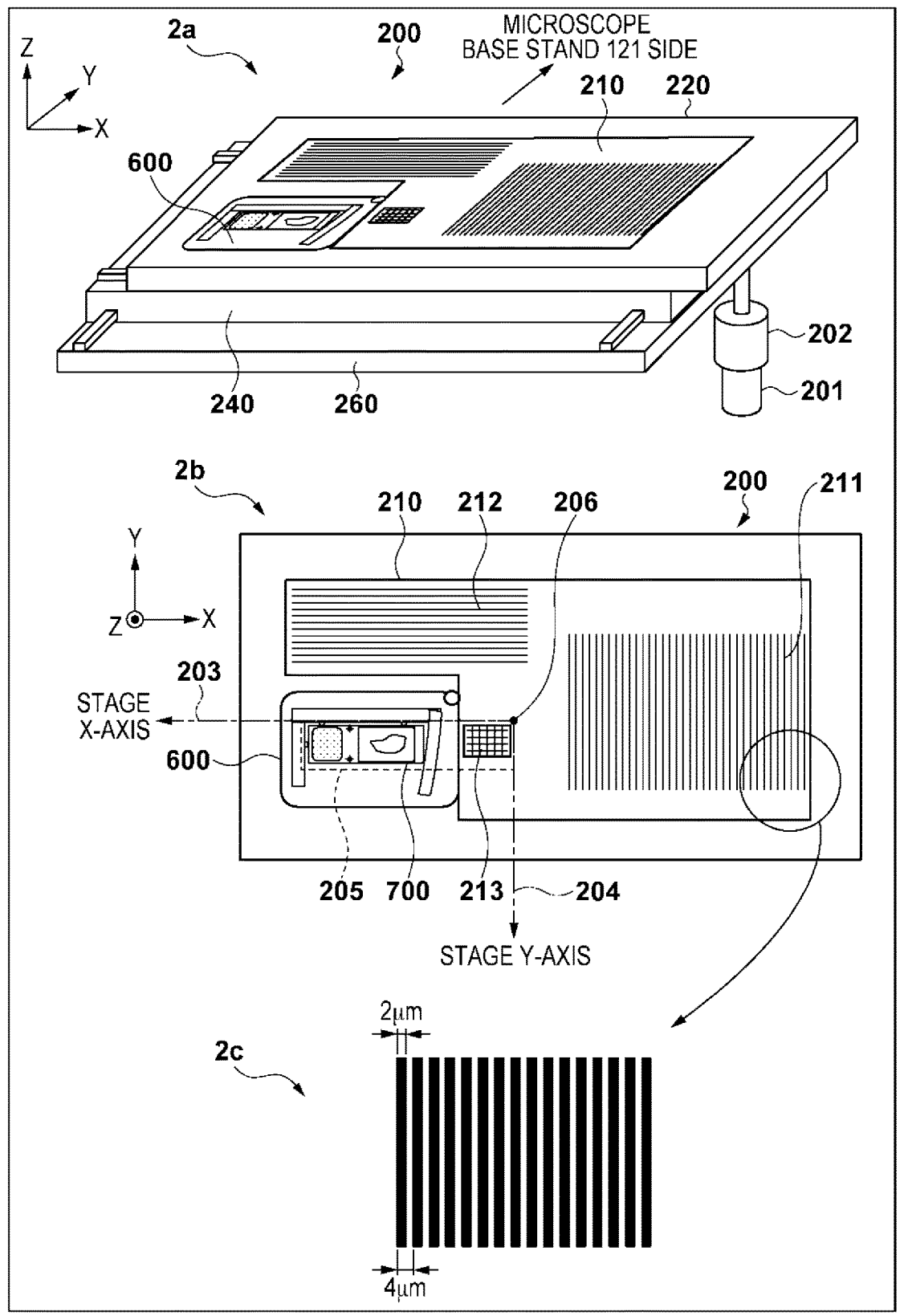
[Fig. 2]

[Fig. 3]
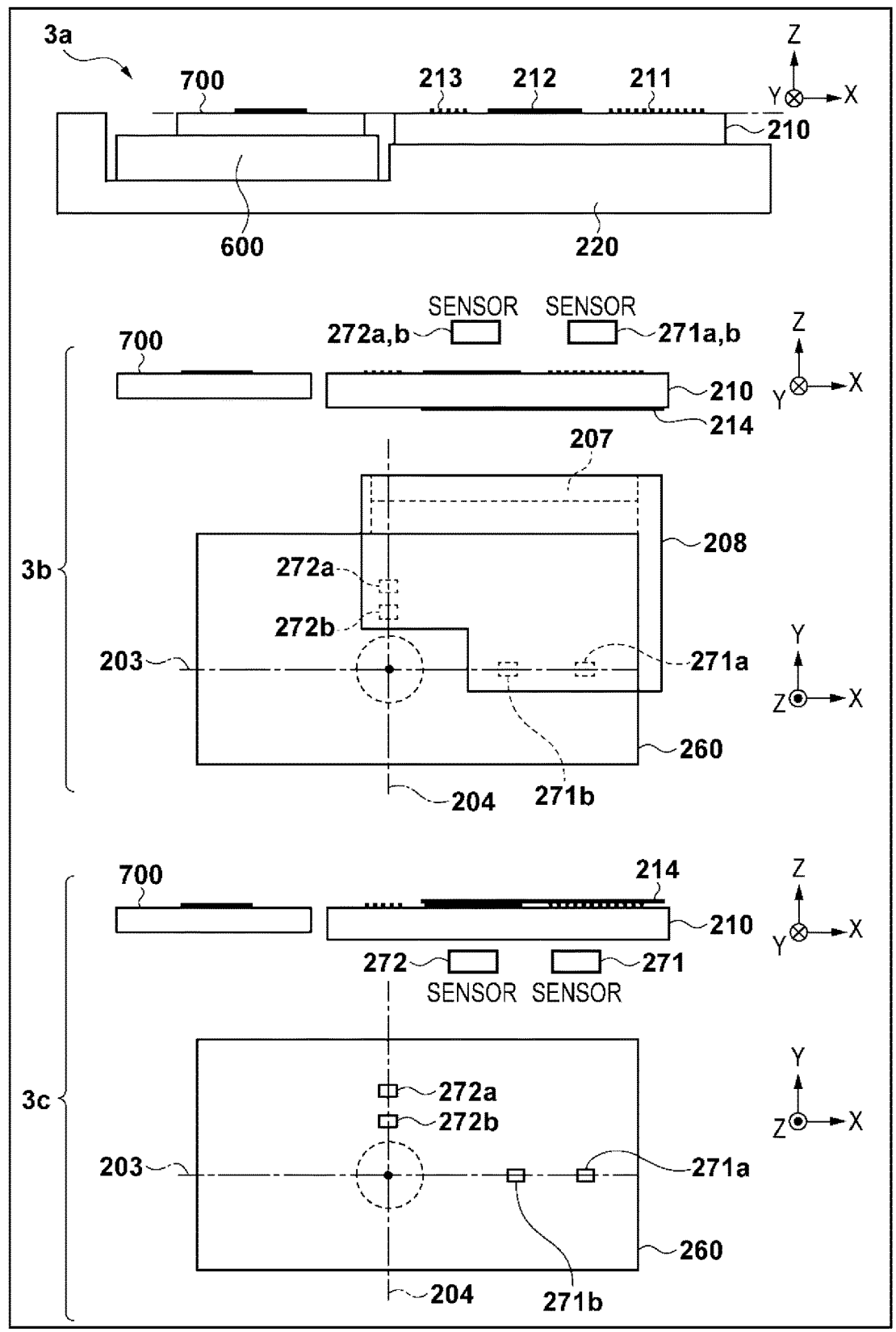

[Fig. 4]
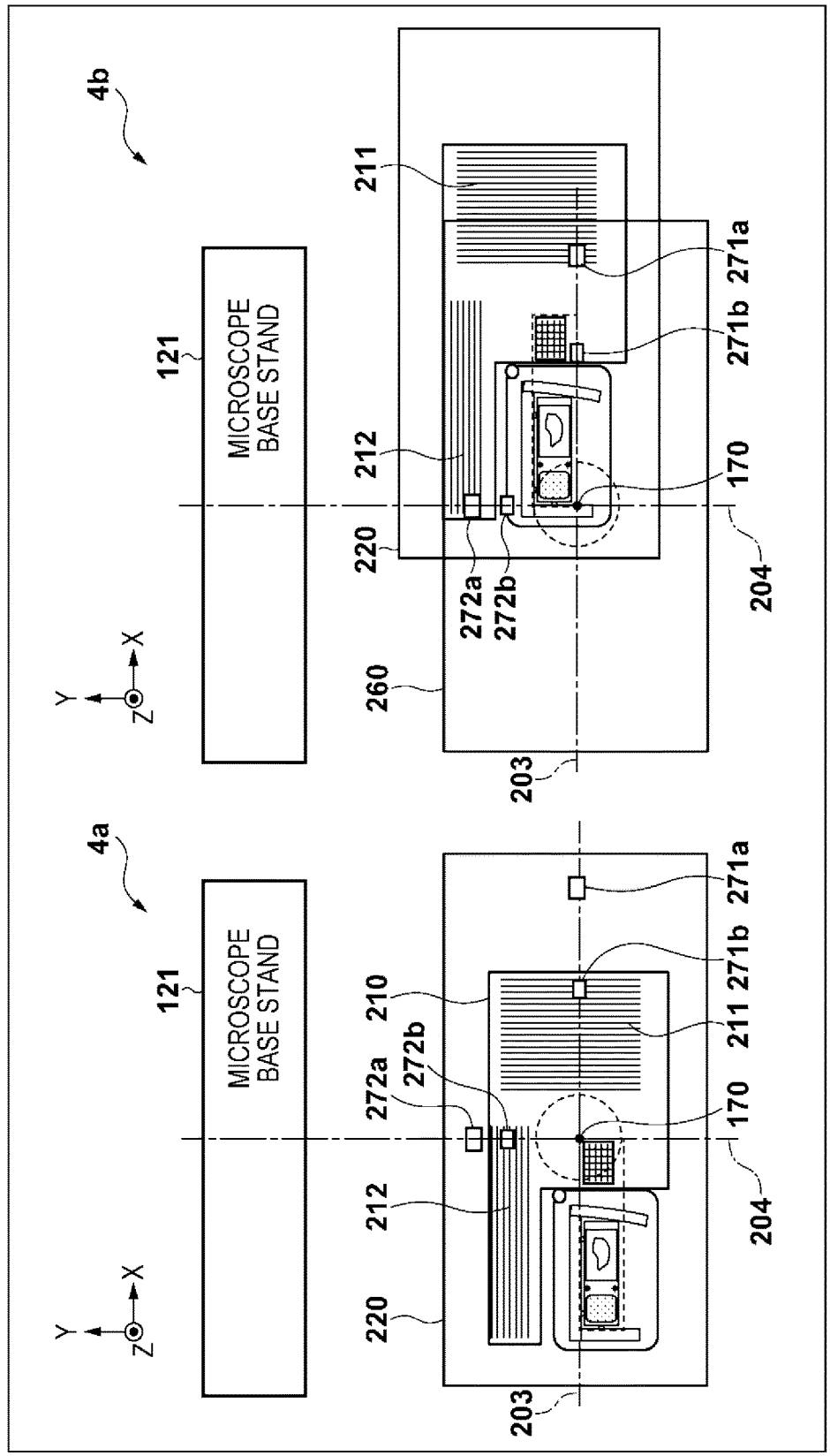

[Fig. 5]
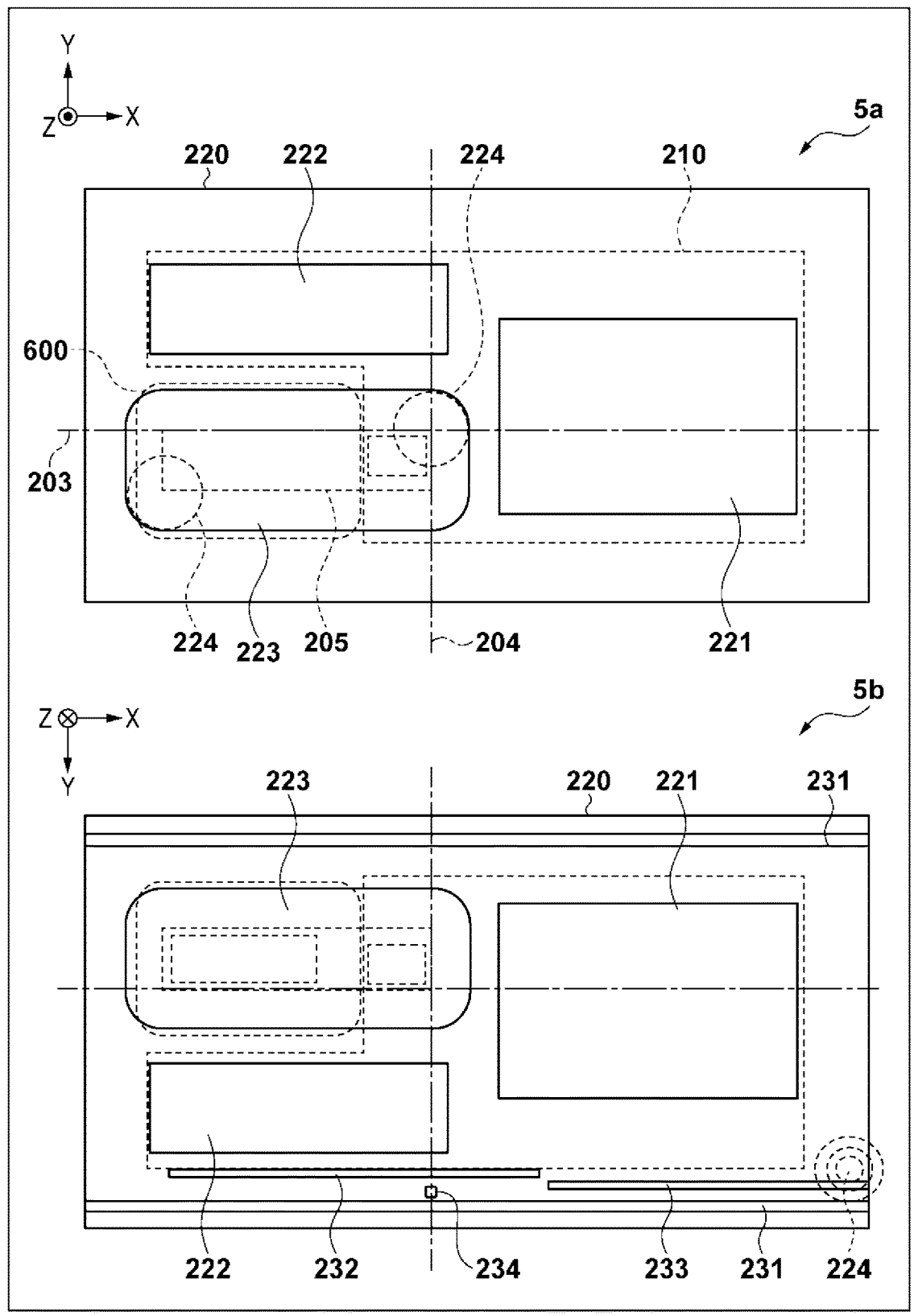

[Fig. 6]
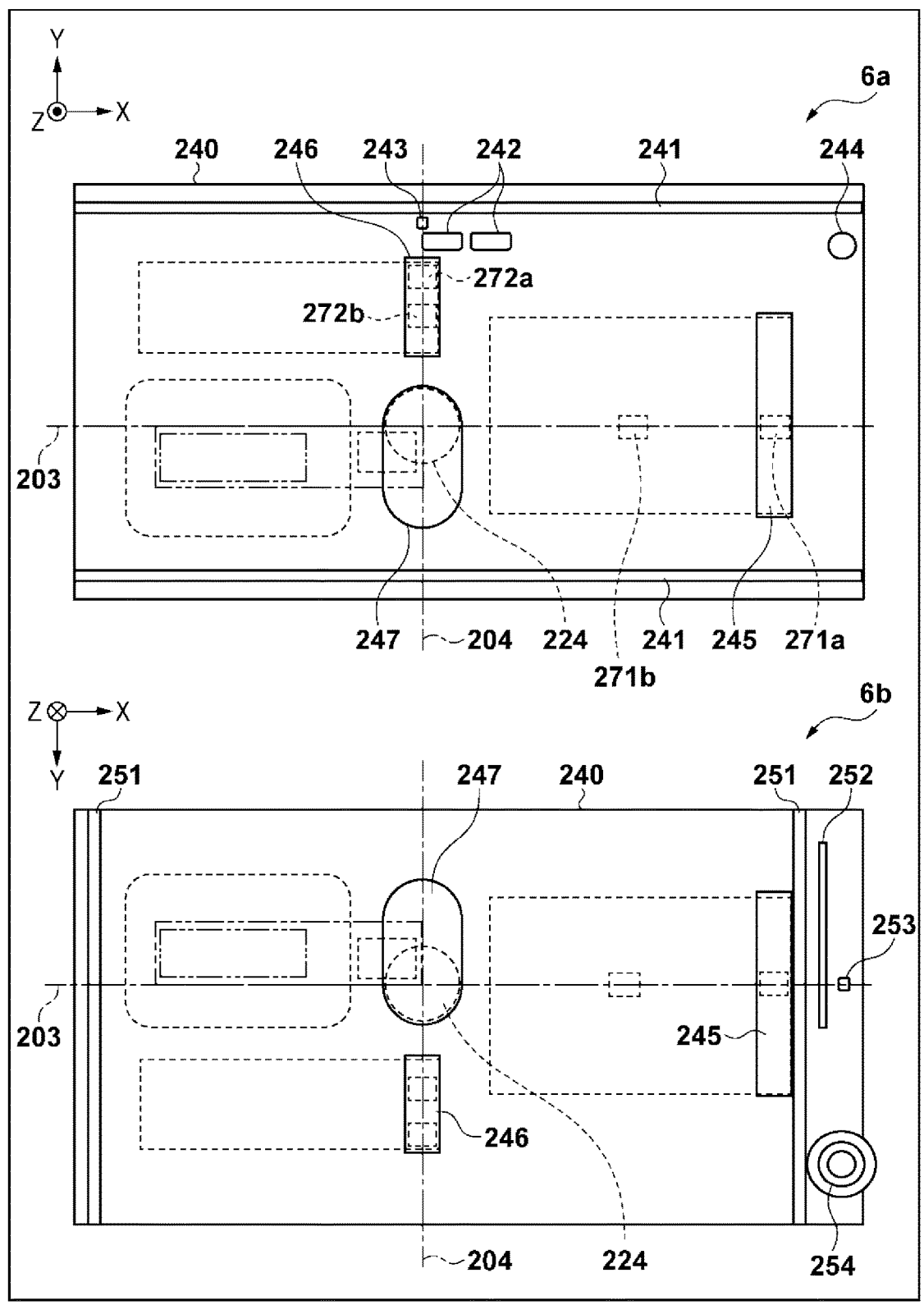

[Fig. 7]
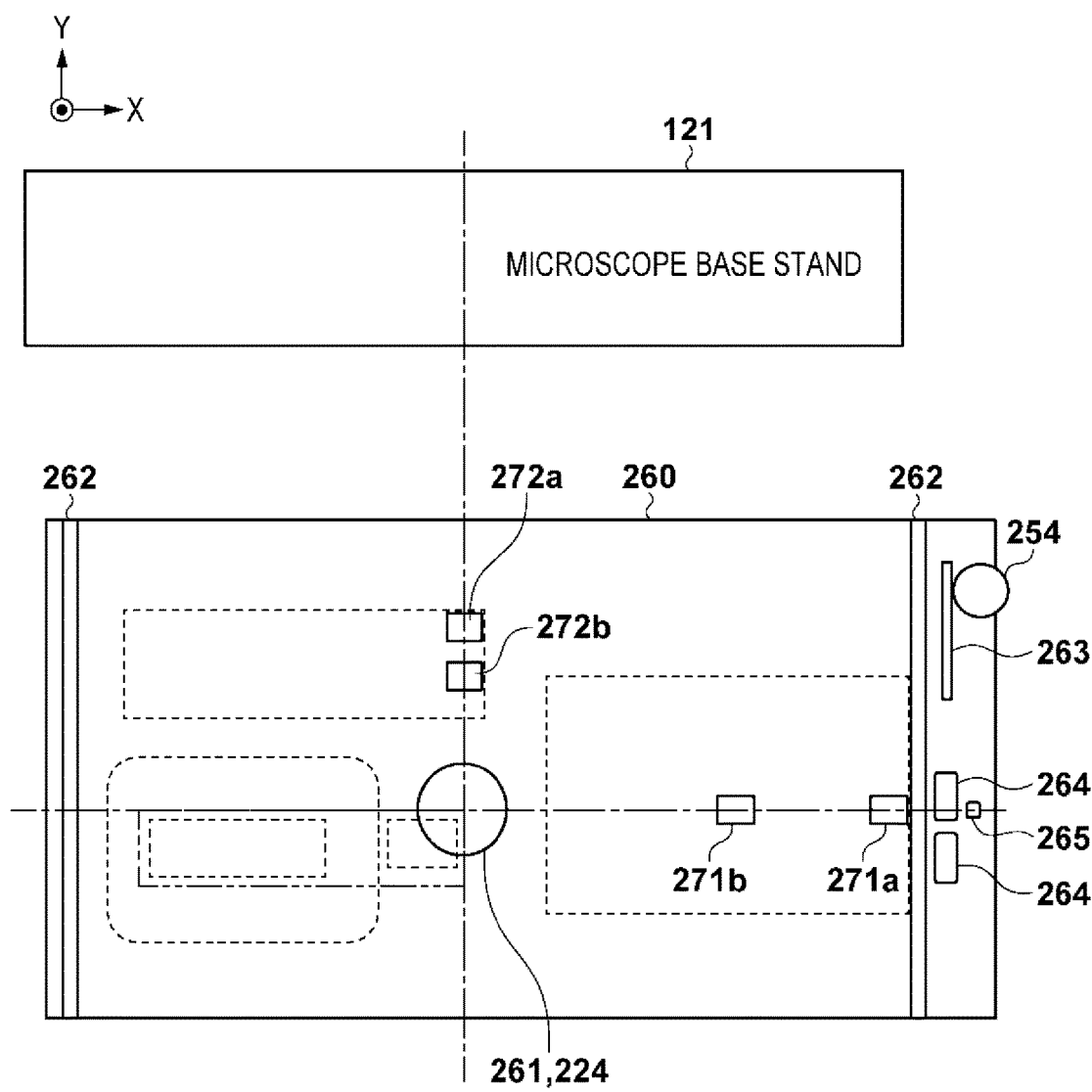

[Fig. 8]
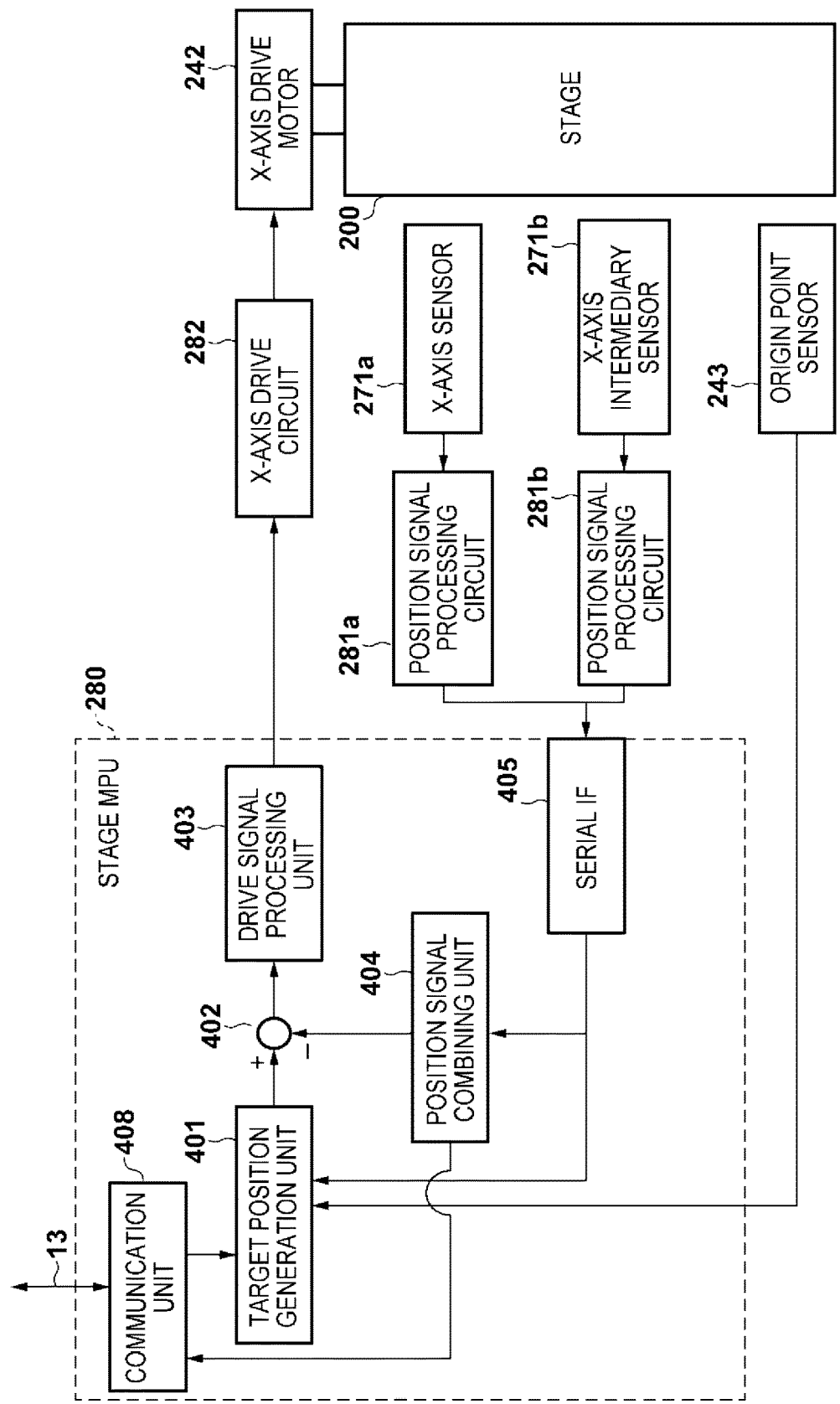

[Fig. 9]
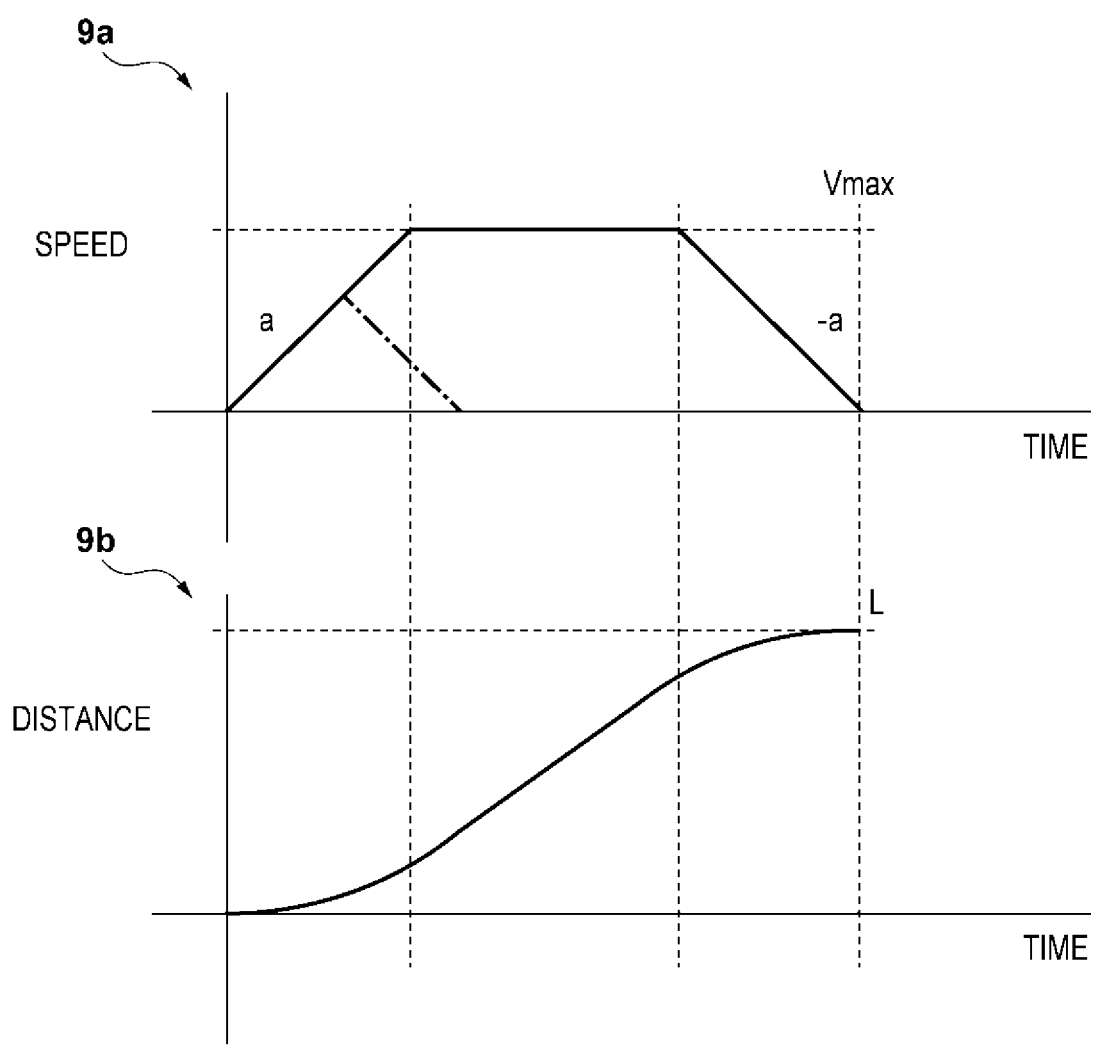

[Fig. 10]
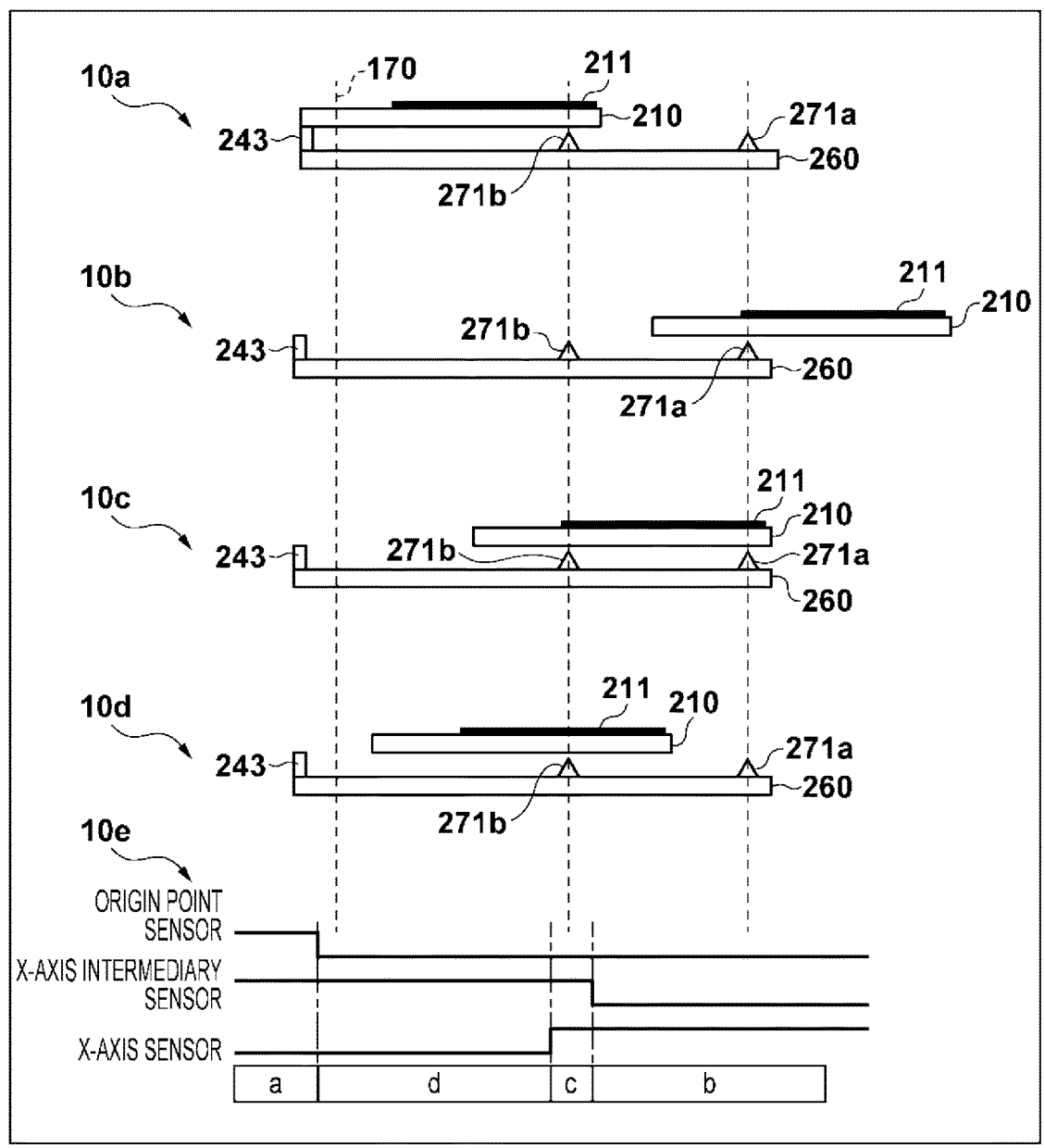

[Fig. 11]
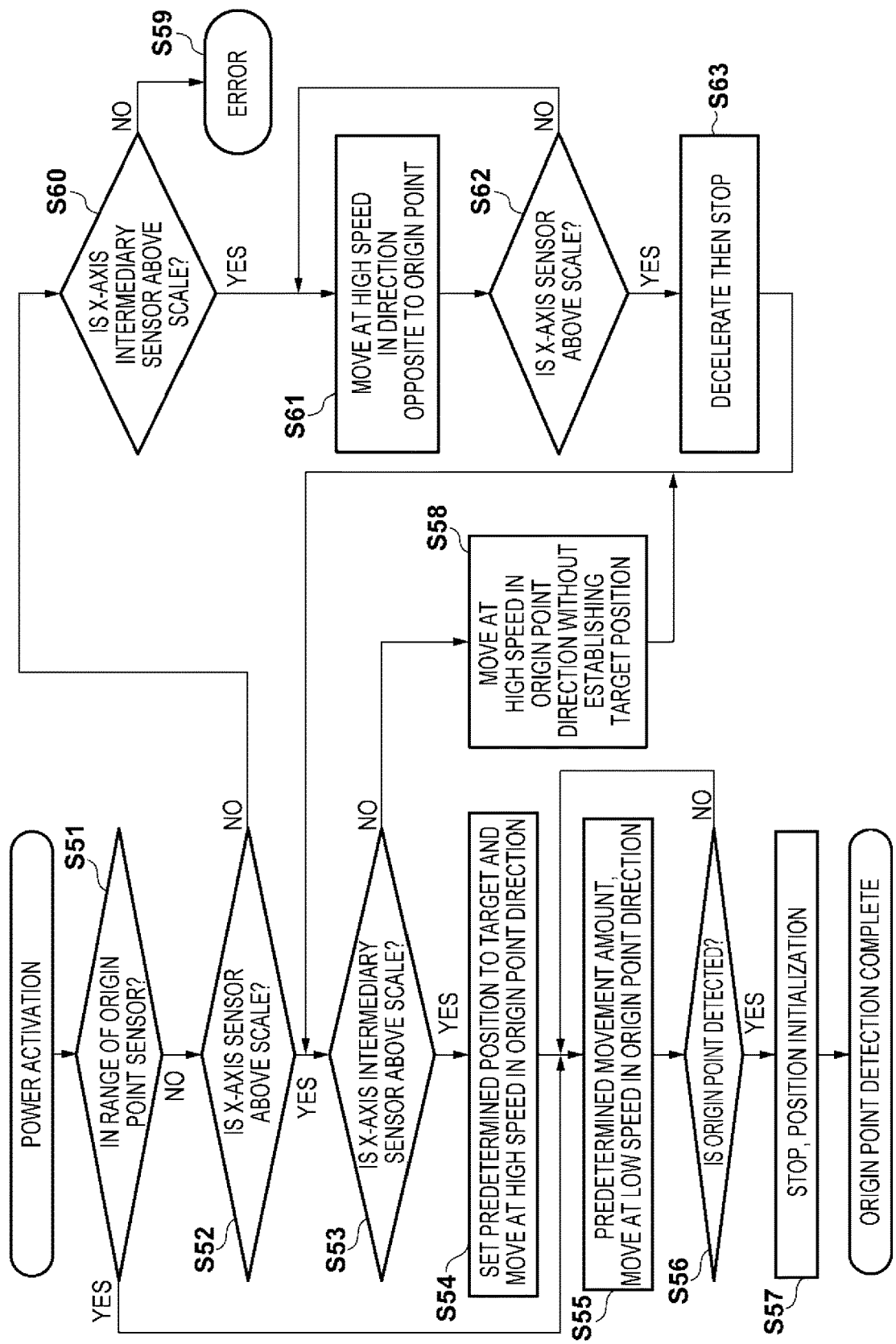

[Fig. 12]
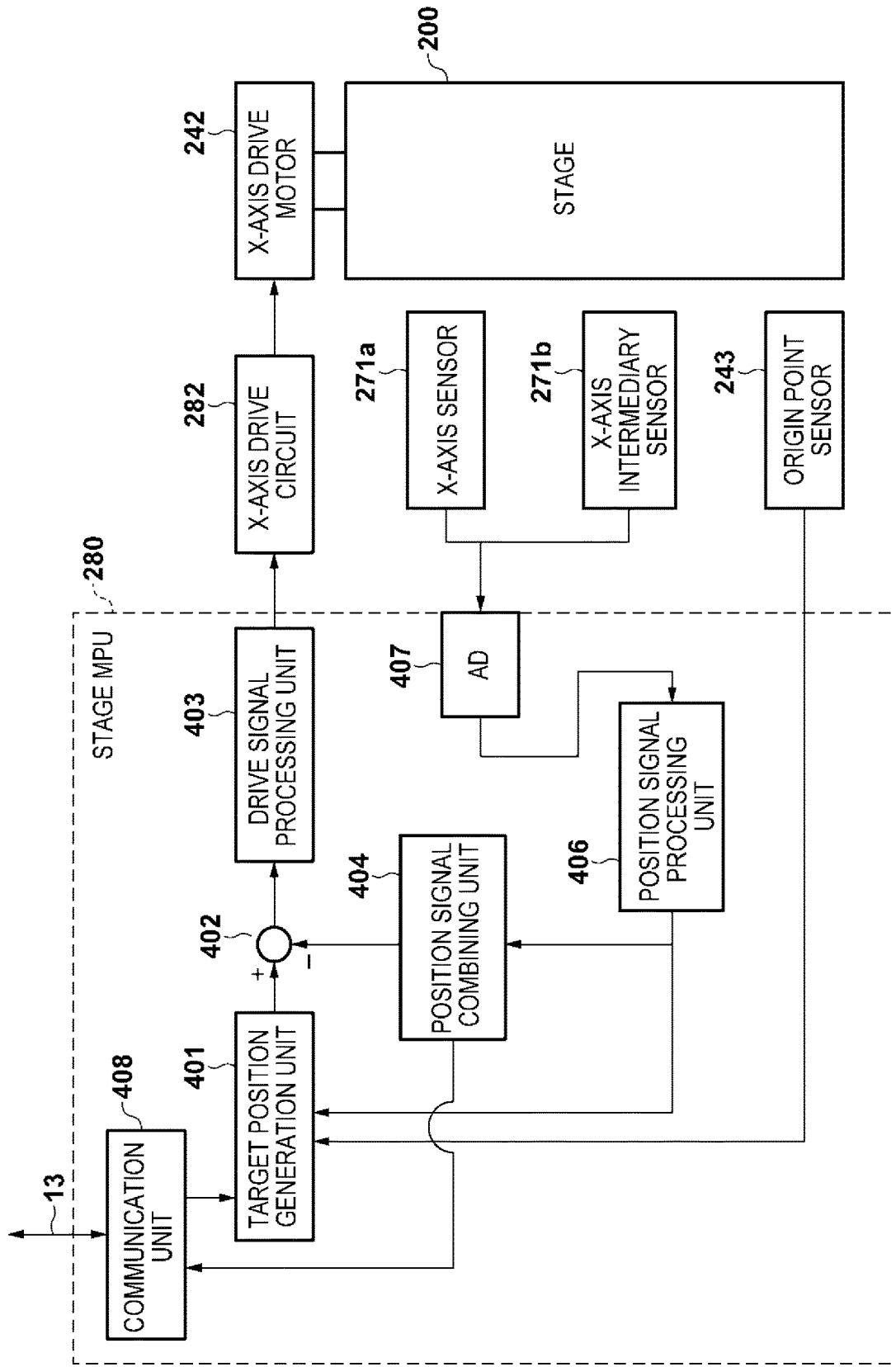

[Fig. 13]
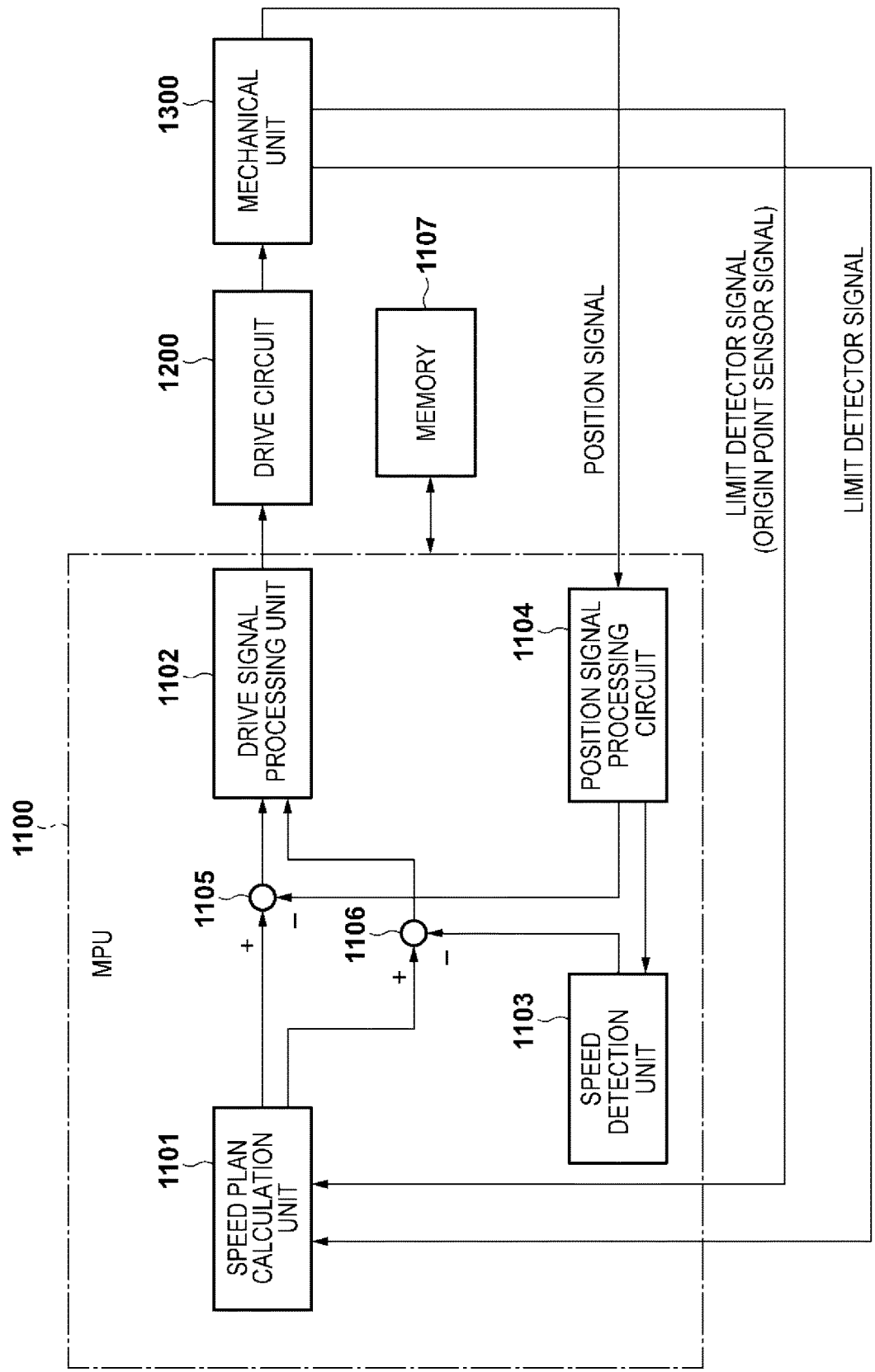

[Fig. 14]
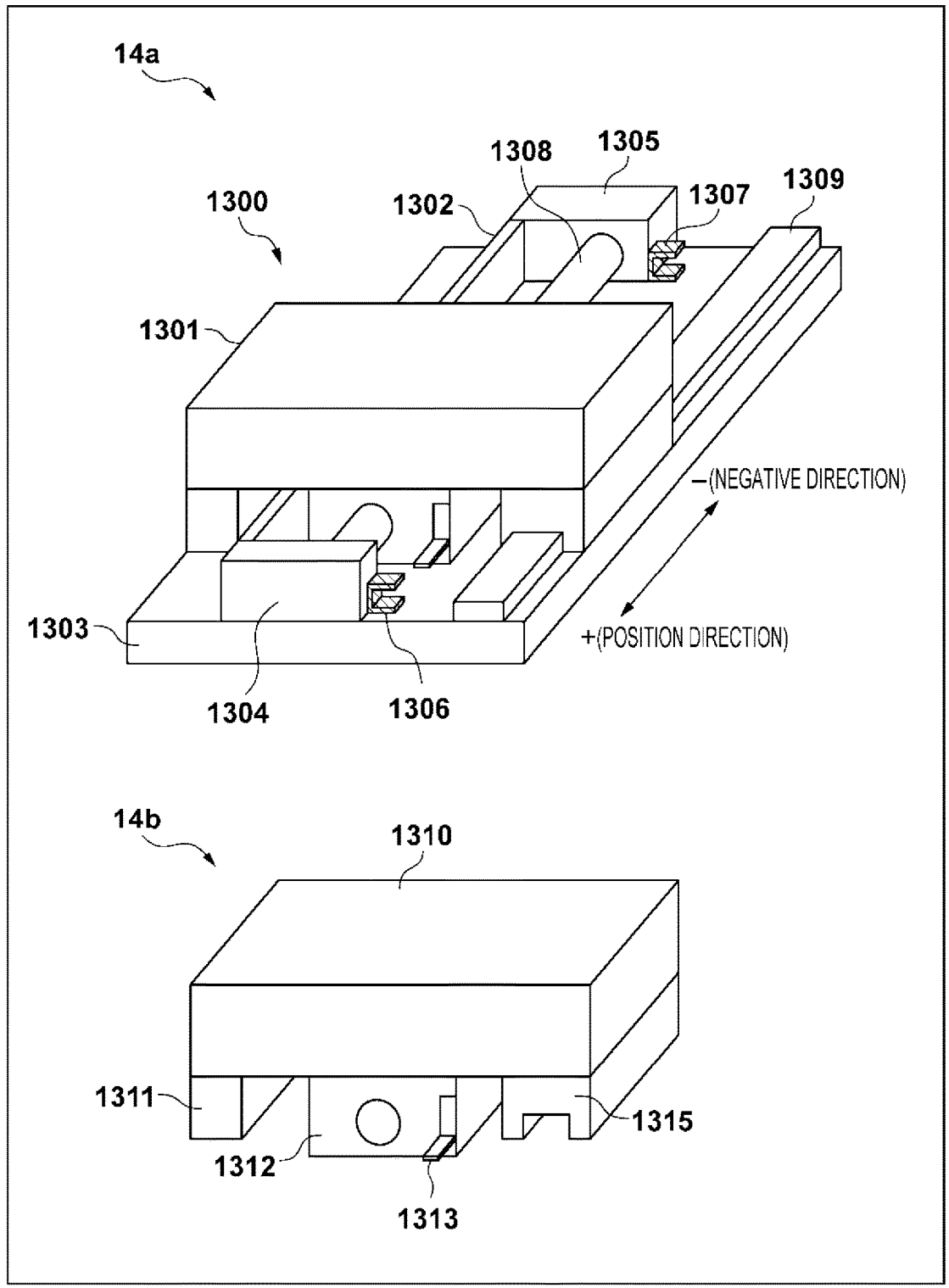

[Fig. 15]
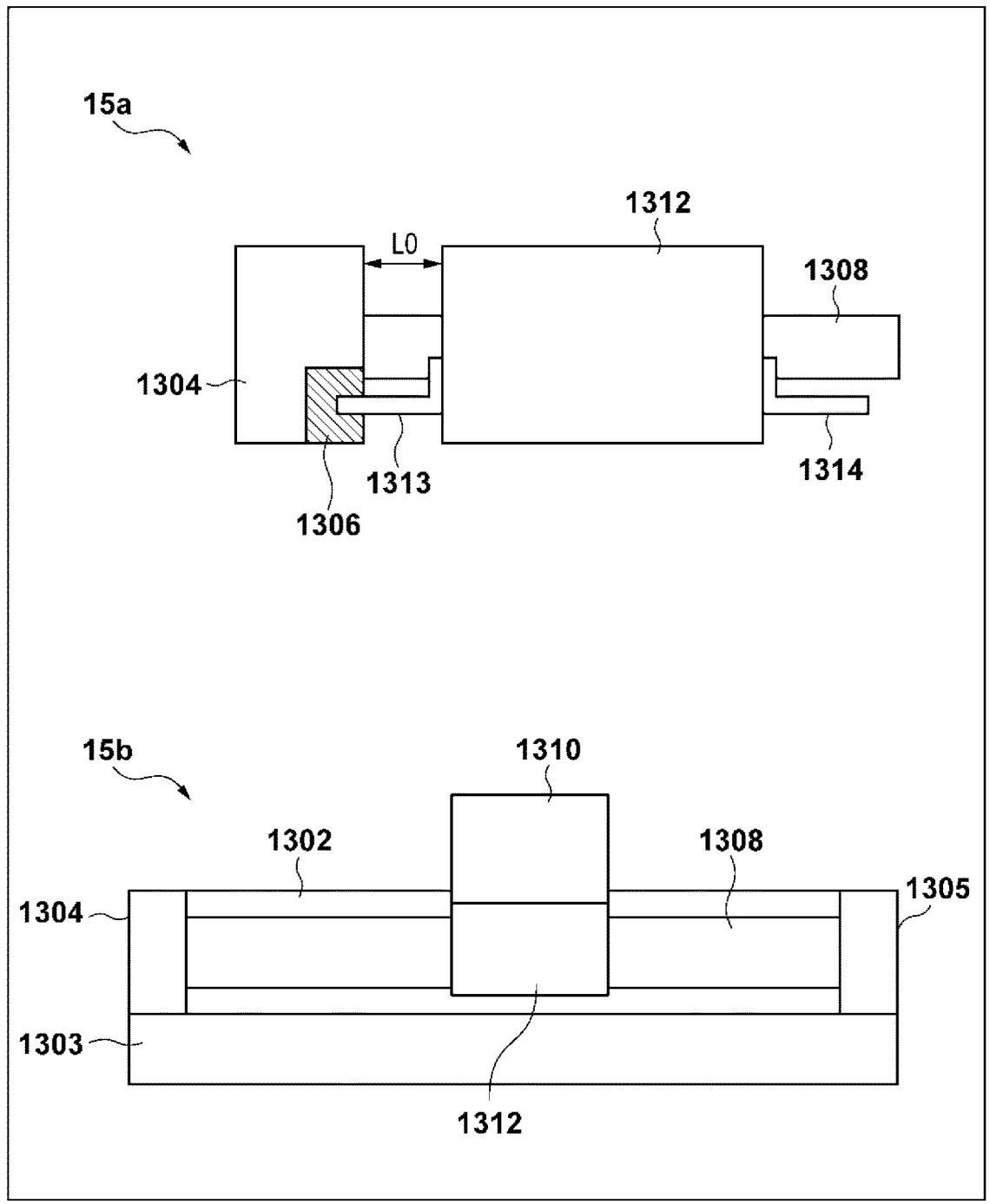

[Fig. 16]
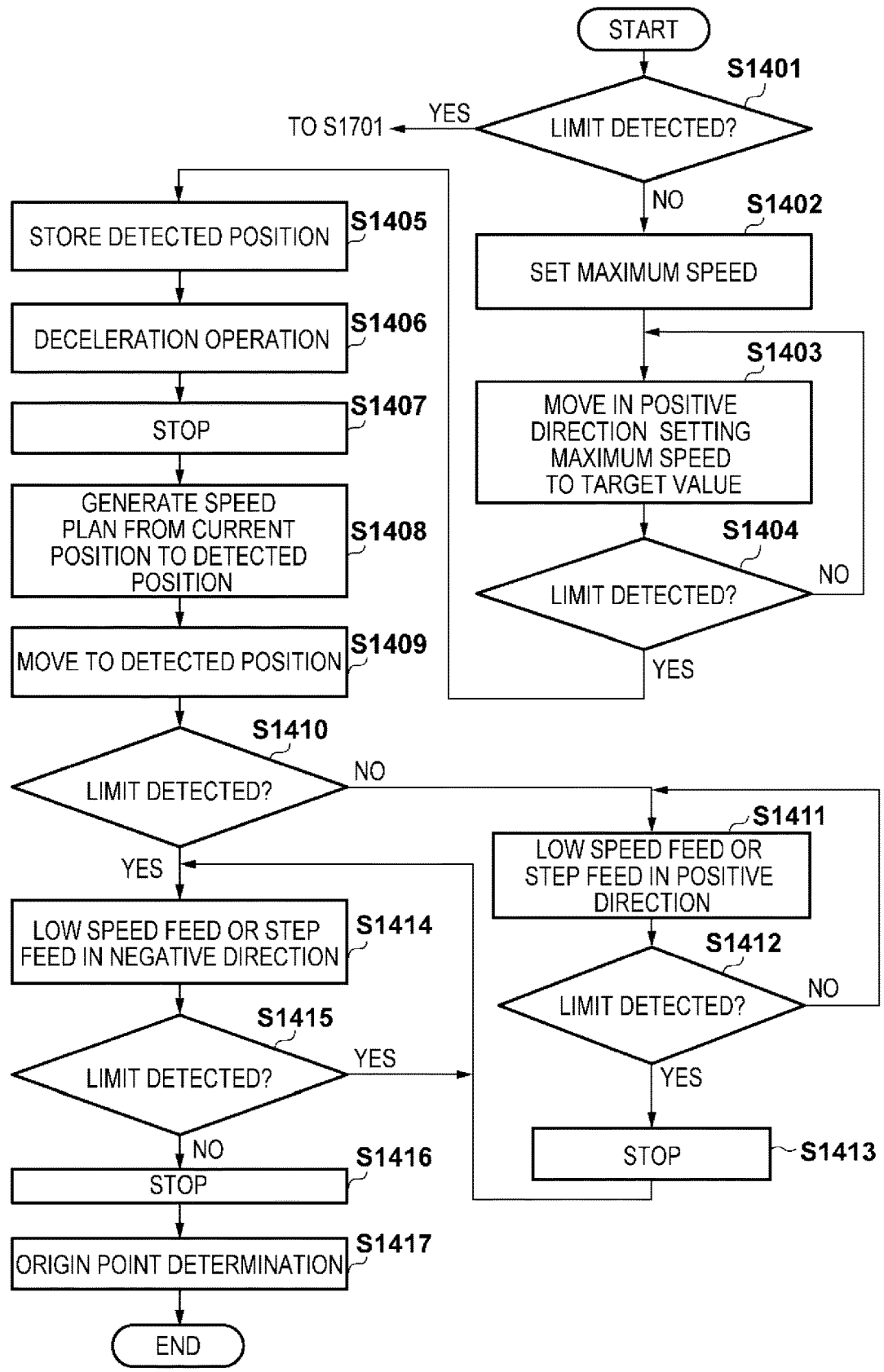

[Fig. 17]
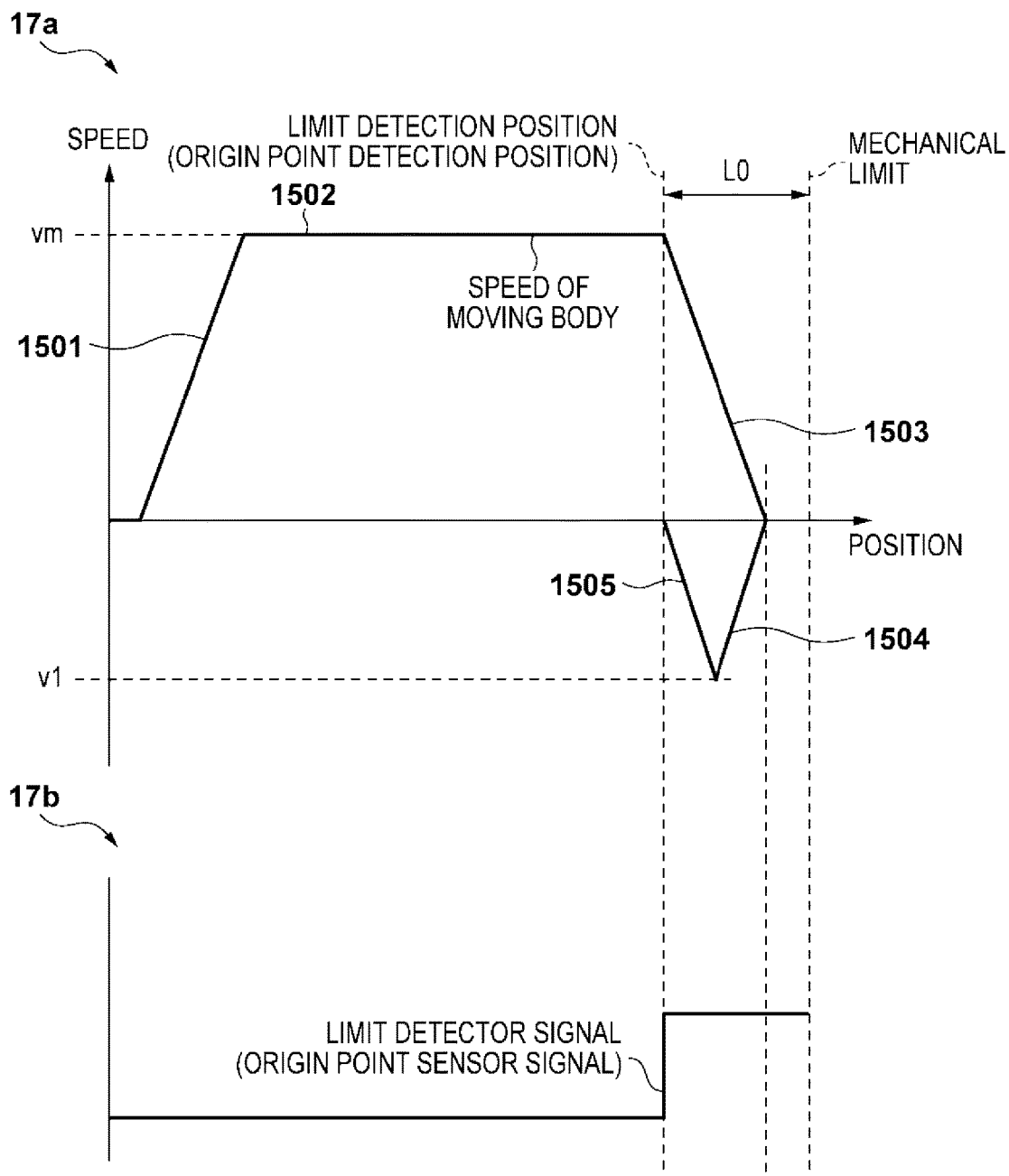

[Fig. 18]
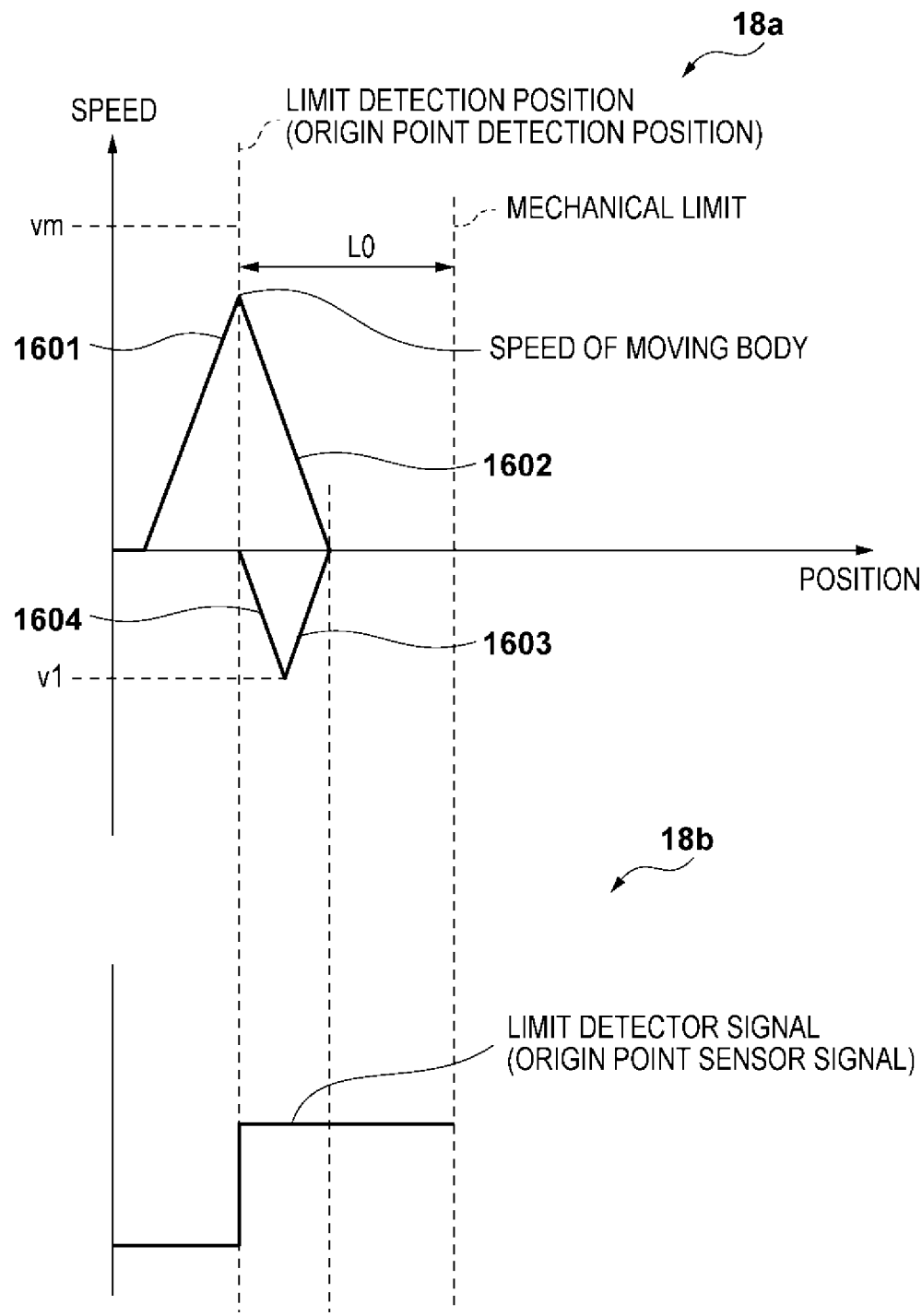

[Fig. 19]
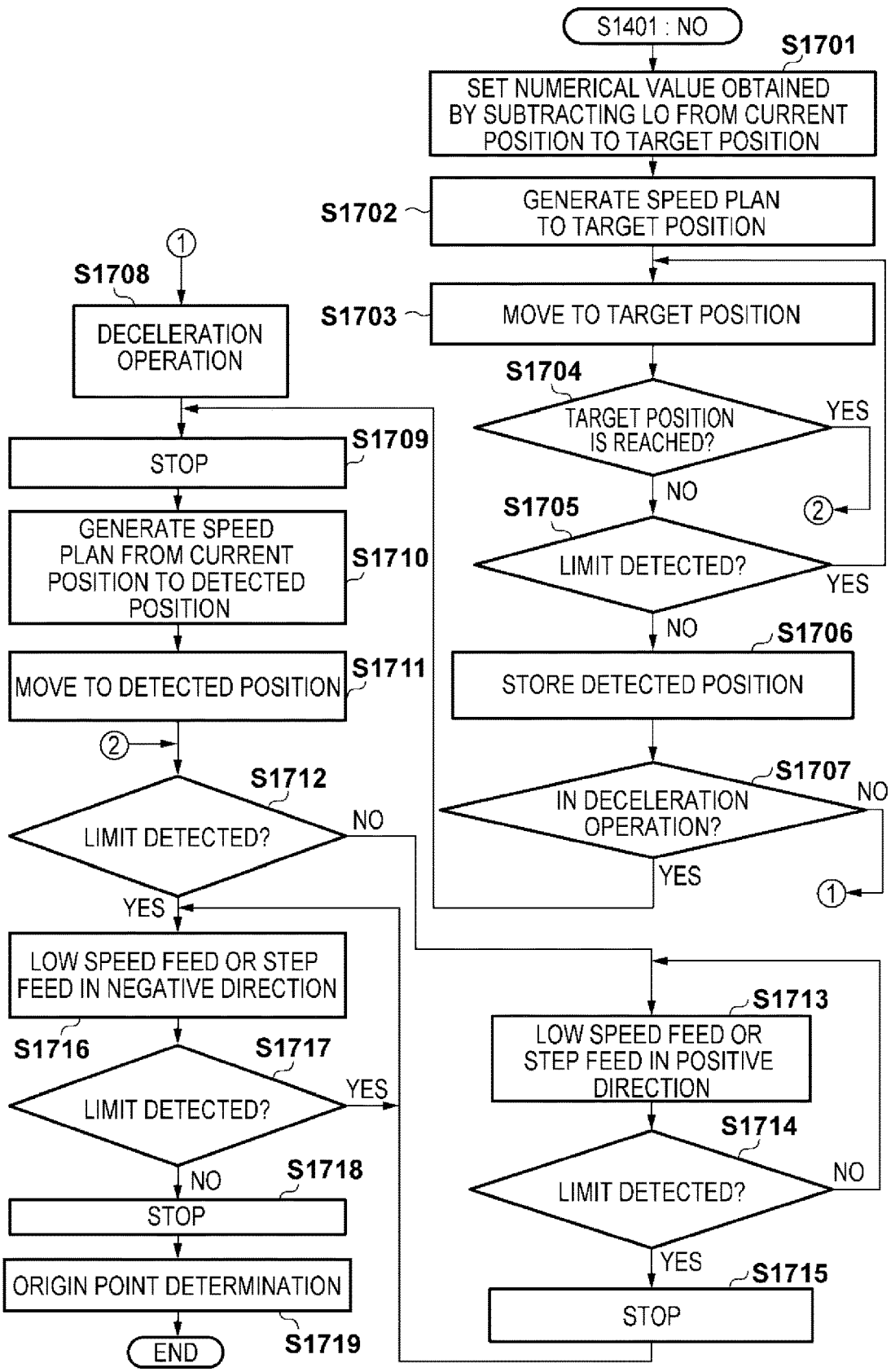

[Fig. 20]
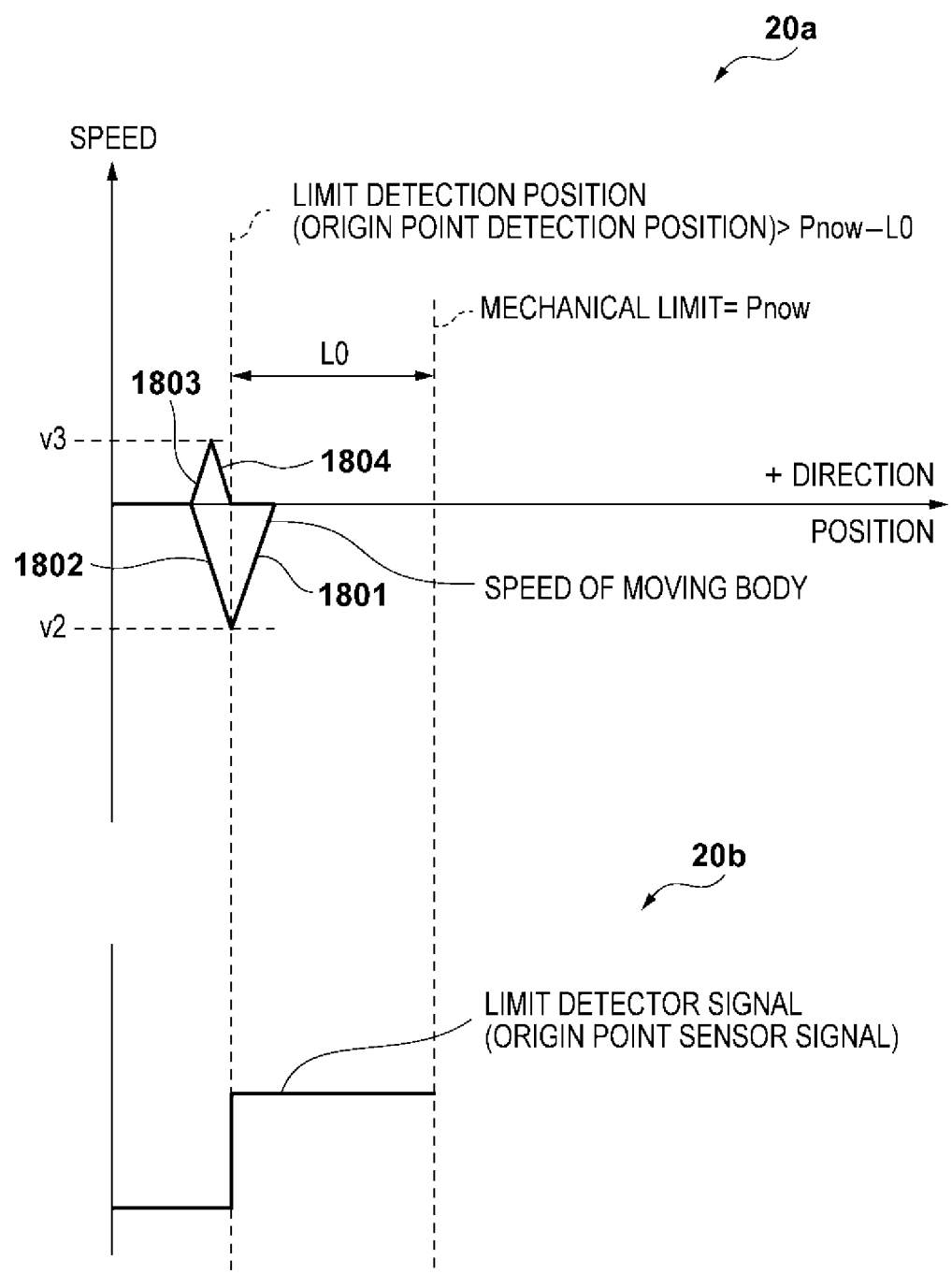

[Fig. 21]
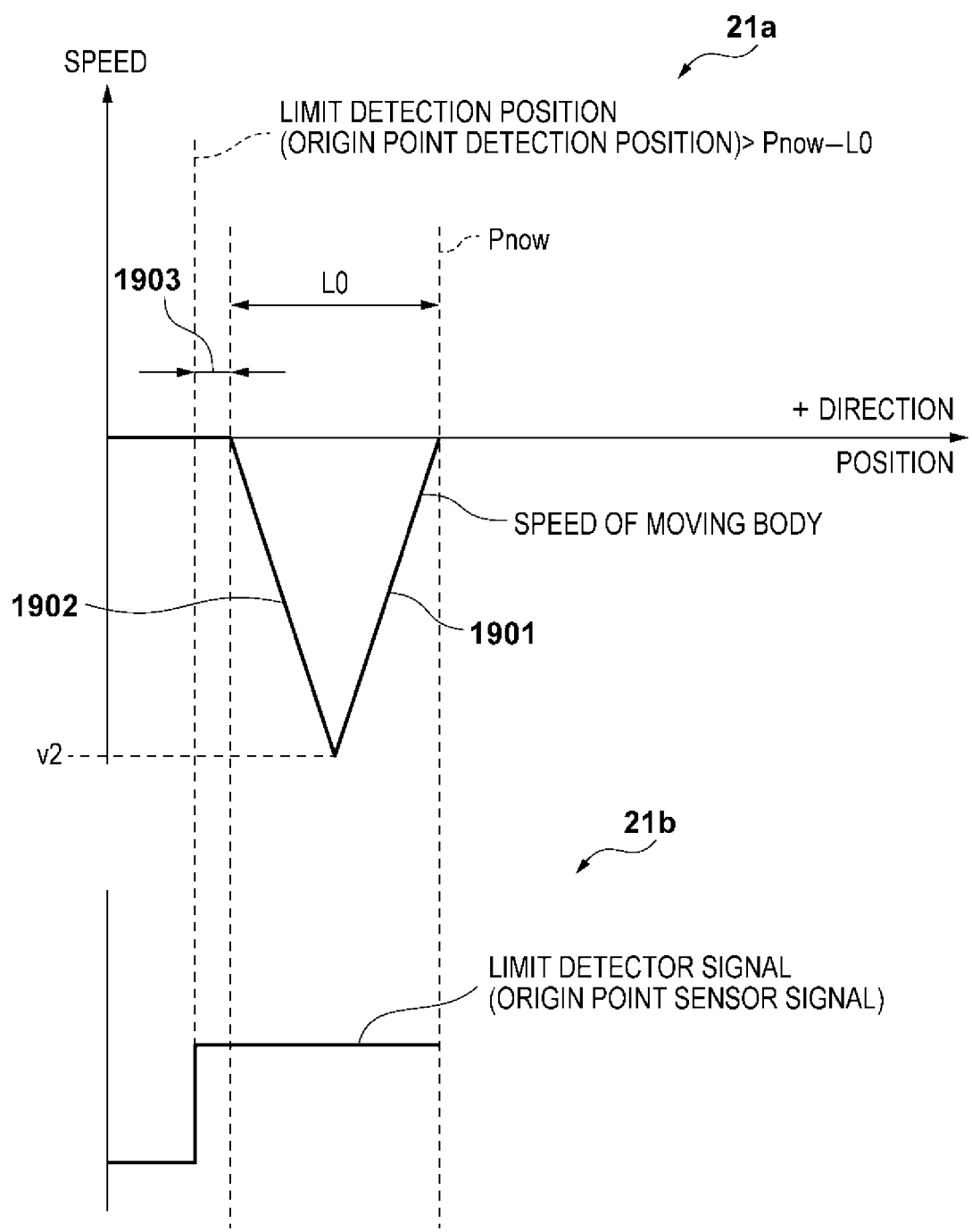

STAGE APPARATUS, METHOD OF CONTROLLING STAGE APPARATUS, AND MICROSCOPE SYSTEM

TECHNICAL FIELD

The present invention relates to a stage apparatus, a method of controlling a stage apparatus, and a microscope system.

BACKGROUND ART

Conventionally, a stage apparatus, which can move to any position instructed by a controller such as a PC and detect position information of a stage by a sensor and linear scale mounted on axes of a linear stage that is driven by a motor or the like, is used in various fields. In this type of stage apparatus, an approach is often used that uses an incremental scale because of cost, physical restrictions, and the like, initializes a count at a specific position (an origin point), and detects a position from the count. In such an approach, because initialization at the origin point is not been performed when power is initially input, a state in which a current position is not understood is entered. Therefore, after power activation, firstly there is a need to detect the origin point.

In addition, if a stage apparatus is used as an XY-stage for position management in an optical microscope or the like, a design in which the length of a scale is shortened by handing over reading of the scale to a plurality of sensors for downsizing of the apparatus can be considered. In other words, configuration is taken to continuously detect the position of the stage in the overall movable range by using a scale shorter than a movable range of the stage and synthesizing position information from a plurality of sensors fixed at intervals shorter than the length of the scale. For synthesis of position information such a plurality of fixed sensors, higher precision detection of the origin point than of something according to a sensor and scale pair is necessary, and for this, it is required that movement be at a low speed at the time of origin point detection. This is because, in a case of changing between a plurality of sensors, if precision of the initial detection of the origin point is not high, a changeover point is not precisely determined.

As a method of detecting an origin point by an incremental scale at high speed, in Japanese Patent Laid-Open No. S62-097004 (hereinafter, Reference 1), in principle, a movement speed of a moving body is controlled in accordance with which of two regions divided by a reference point the moving body is located in. However, in Reference 1, to determine the region in which the moving body is present in, it is necessary to separately provide a configuration for detecting the region. In addition, Japanese Patent Laid-Open No. 2000-056834 (hereinafter, Reference 2) proposes an approach in which a movement speed of a moving body is decelerated at the same time that a vicinity of an origin point is detected. However, in the approach of Reference 2, a restriction of the origin point position arises in that the origin point must be placed at a position such that the moving body can stop in a mechanically movable range by the deceleration in accordance with the detection. Furthermore, in Reference 2 it is not possible to detect the origin point at high precision if the movement speed of the moving body at the time of the detection of the origin point is high.

In addition, in relation to an origin return operation of a moving body in a stage apparatus, a configuration is such that the moving body is caused to move to the origin point position at high speed by using two sensors—an origin point sensor and an origin point vicinity sensor—in the above-described Reference 2. Also, Japanese Patent Laid-Open No. H11-170122 (hereinafter, Reference 3) proposes using an origin point sensor and a position counter (for example, an encoder) to perform position control from the positional relationship of each sensor without using an origin point vicinity sensor, to realize movement of a moving body at high speed to an origin point.

None of the above-described patents 1-3 commonly use an origin point sensor and a limit sensor stipulating a movement range of a moving body; an origin point position is arranged to be a position that is separated from a movement limit position (a mechanical limit) of a moving body. It is often the case that positions of a limit sensor and a mechanical limit are close. Accordingly, in a stage apparatus that sets a detection point of such a limit sensor as an origin point, it is difficult to cause the moving body to move to the origin point position without contacting the mechanical limit and also at high speed in a state in which the relation between the mechanical limit and the current position of the moving body is not understood. In a stage apparatus that performs high precision position management, contacting the mechanical limit causes mechanical precision of a positioning apparatus to worsen, and as a result precision of position management worsens. Thus, it is necessary to avoid contact with the mechanical limit, and also to be able to perform an origin point movement operation and an origin return operation at high speed.

Even in the case of using an incremental-type scale for control of the moving body in the positioning apparatus, because position information of the positioning apparatus is initialized at a time of power activation, an amount of movement to the origin point is unknown. In the end, in the case of performing origin return with the detection point of the limit sensor as the origin point, to prevent the moving body reaching the mechanical limit and mechanically interfering, it is necessary to cause the moving body to move to the detection point of a limit detector by a low-speed feed operation.

In the above method, because the moving body is caused to move at low speed, it requires a long time for origin return. This is even more the case if the movable range of the moving body is large. Such a long time for origin return is a factor in causing work efficiency of an operator to worsen. In addition, when performing high-speed origin return and an origin point movement operation under the above conditions, a sensor or the like becomes necessary in the vicinity of the origin point, a number of components increases, and affects costs.

SUMMARY OF INVENTION

By virtue of embodiments of the present invention, a stage apparatus that realizes recovery to an origin point position at high speed and with high precision is disclosed.

In addition, by virtue of embodiments of the present invention, a stage apparatus that can determine a position of a moving body at high speed by using a sensor that restricts a movement range of the moving body is disclosed.

According to one aspect of the present invention there is provided a stage apparatus, comprising: an incremental scale fixed to a movable unit and having a predetermined length shorter than a distance the movable unit can move in a first direction; a first and a second sensor for reading the scale that are arranged in the first direction with an interval therebetween shorter than the predetermined length; detection means for detecting an origin point position set in a movable range of the movable unit; and movement control means for performing an origin return that moves the movable unit to the origin point position, wherein if the movable unit is at a position at which both the first sensor and the second sensor can read the scale, the movement control means executes, in the origin return, a first movement that causes the movable unit to move a predetermined distance in a direction of the origin point position, and, after the first movement, a second movement that causes the movable unit to move at a lower speed than the first movement until the detection means detects the origin point position.

According to another aspect of the present invention there is provided a method of controlling a stage apparatus, comprising: an incremental scale fixed to a movable unit and having a predetermined length shorter than a distance the movable unit can move in a first direction; a first and a second sensor for reading the scale that are arranged in the first direction with an interval therebetween shorter than the predetermined length; detection means for detecting an origin point position set in a movable range of the movable unit, the method comprising: in an origin return that moves the movable unit to the origin point position, a first movement step of, if the movable unit is at a position at which both the first sensor and the second sensor can read the scale causing the movable unit to move a predetermined distance in a direction of the origin point position, and, a second movement step of after the movement in the first movement step, causing the movable unit to move at a lower speed than in the first movement step until the detection means detects the origin point position.

According to another aspect of the present invention there is provided a program for causing a computer for controlling a stage apparatus comprising an incremental scale fixed to a movable unit and having a predetermined length shorter than a distance the movable unit can move in a first direction; a first and a second sensor for reading the scale that are arranged in the first direction with an interval therebetween shorter than the predetermined length; and detection means for detecting an origin point position set in a movable range of the movable unit, to execute: in an origin return that moves the movable unit to the origin point position, a first movement step of, if the movable unit is at a position at which both the first sensor and the second sensor can read the scale causing the movable unit to move a predetermined distance in a direction of the origin point position, and, a second movement step of after the movement in the first movement step, causing the movable unit to move at a lower speed than in the first movement step until the detection means detects the origin point position.

According to another aspect of the present invention there is provided a microscope system comprising the above-described stage apparatus as a stage for placing a slide.

According to another aspect of the present invention there is provided a microscope system, comprising: a microscope body; a stage that places a slide which is an observation target, and that is mounted on the microscope body, and that has an XY-stage that moves in an X direction and a Y direction that are orthogonal to each other; an XY scale plate that is fixed to the XY-stage and that has an incremental scale having a predetermined length shorter than a distance the XY-stage can move in each of the X direction and the Y direction; and for each of the X direction and the Y direction, comprises: a first and a second sensor for reading the scale that are arranged with an interval therebetween shorter than the predetermined length; detection means for detecting an origin point position set in a movable range of the XY-stage; and movement control means that, if the XY-stage is at a position at which both the first sensor and the second sensor can read the scale, executes, in an origin return that moves the XY-stage to the origin point position, a first movement that causes the XY-stage to move a predetermined distance in a direction of the origin point position, and, after the first movement, a second movement that causes the XY-stage to move at a lower speed than the first movement until the detection means detects the origin point position.

According to another aspect of the present invention there is provided a stage apparatus in which a moving body moves in predetermined axial directions, the apparatus comprising: a sensor for detecting that the moving body has reached within a range of a first distance from a position of a movement limit of the moving body; obtaining means for obtaining a moving speed at which it is possible to stop the moving body within the first distance by decelerating the moving body by a predetermined acceleration; and control means for executing first movement processing that causes the moving body to move toward the sensor by setting the movement speed obtained by the obtaining means as a target, and causing the moving body to stop within the first distance in accordance with the sensor detecting the moving body, and, after the first movement processing, moving the moving body to a position at which a detection status of the moving body by the sensor switches.

According to another aspect of the present invention there is provided a method of controlling a stage apparatus in which a moving body moves in predetermined axial directions, the stage apparatus comprising a sensor that detects that the moving body has reached within a range of a first distance from a position of a movement limit of the moving body, the method comprising: an obtaining step of obtaining a moving speed at which it is possible to stop the moving body within the first distance by decelerating the moving body by a predetermined acceleration; and a controlling step of, if the sensor does not detect the moving body, moving the moving body toward the sensor with the movement speed obtained by the obtaining step as a target, executing first movement processing that causes the moving body to stop within the first distance in accordance with the sensor detecting the moving body, and after the first movement processing, moving the moving body to a position at which a detection status of the moving body by the sensor switches.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 A diagram illustrating a basic configuration of a position management microscope system according to the embodiment.

FIG. 2 (2a) is a diagram illustrating an outer appearance of a stage mounted to a microscope of embodiments, 2b is a diagram illustrating a top surface of the stage, 2c is a diagram illustrating a magnification of a part of an area scale.

FIG. 3 (3a) is diagram from the perspective of a lateral face of the position management surface stage (X-stage), 3b and 3c are diagrams explaining a positional relationship of X-axis and Y-axis sensors with an XY scale plate.

FIG. 4 A diagram illustrating a positional relationship of X- and Y-area scales and X-axis and Y-axis sensors and a skew sensor.

FIG. 5 A diagram illustrating a position management surface stage.

FIG. 6 A diagram illustrating a Y-stage.

FIG. 7 A diagram illustrating a stage base.

FIG. 8 A diagram illustrating an example configuration of a stage controller according to embodiments.

FIG. 9 A diagram illustrating a driving of a position management surface stage during high speed movement according to the embodiment.

FIG. 10 A diagram illustrating a positional relationship of a scale, a sensor, and an origin point according to the embodiment.

FIG. 11 A flowchart for describing a process for an origin return according to the embodiment.

FIG. 12 A block diagram illustrating an example configuration of the stage controller according to another configuration.

FIG. 13 A block diagram illustrating a functional configuration of a stage apparatus according to the embodiment.

FIG. 14 (14a) is a perspective view for explaining a configuration of a mechanical unit 300, and 14b is a perspective view explaining a configuration of a moving body 301.

FIG. 15 (15a) is a diagram explaining a relationship of a mechanical limit and a detection point of a limit detection sensor, and 15b is a diagram explaining a relationship of a magnet shaft and a coil unit.

FIG. 16 A flowchart illustrating a movement operation to the origin point position of a moving body according to the embodiment.

FIG. 17 (17a) is a diagram explaining a speed plan for a transition of a moving body to an origin point position and 17b is a diagram illustrating a detection signal of a limit detection sensor.

FIG. 18 (18a) is a diagram explaining a speed plan for a transition of a moving body to an origin point position, and 18b is a diagram illustrating a detection signal of a limit detection sensor.

FIG. 19 A flowchart illustrating an operation to move to the origin point position of a moving body according to the embodiment.

FIG. 20 (20a) is a diagram explaining a speed plan for a transition of a moving body to an origin point position, and 20b is a diagram illustrating a detection signal of a limit detection sensor.

FIG. 21 (21a) is a diagram explaining a speed plan for a transition of a moving body to an origin point position, and 21b is a diagram illustrating a detection signal of a limit detection sensor.

DESCRIPTION OF EMBODIMENTS

Below, a suitable embodiment of the present invention is described with reference to the attached figures.

First Embodiment

The present embodiment relates to a stage apparatus that supports position management, and a microscope system that implements high precision position management of an observation position by comprising the stage apparatus. FIG. 1 is a diagram illustrating a basic configuration of a position management microscope system (hereinafter referred to as a microscope system 10) according to this embodiment. The microscope system 10 comprises a microscope body 100, a stage 200, an adapter unit for a camera mount 300, a digital camera 400, and a control unit 500. The microscope body 100 is an optical microscope. The control unit 500 comprises a controller 501 and a display 502. The controller 501 includes a CPU (not shown) and a memory (not shown), and by the CPU executing a program stored in the memory, executes various processes such as an image capturing instruction to the digital camera 400, displaying or saving of a captured microscope image, a position management of the stage 200, and the like.

A microscope base stand 121 constituting the microscope body 100 is a solid main body frame for mounting various structures of the microscope. An eyepiece microscope base stand 122 is fixed to the microscope base stand 121 and connected to an eyepiece barrel 123 (binocular in the present example). A light source box 124 houses a light source (for example a halogen lamp or an LED or the like) for transmission observation and is mounted on the microscope base stand 121. A Z-knob 125 is a knob for moving a Z-base 130 in a Z-axis direction (an upward/downward orientation). The Z-base 130 is mounted to the stage 200 to provide a position management function. The Z-base 130 is mounted to the microscope base stand 121 by a Z base moving mechanism 131 which is for moving the Z-base 130 in a Z-direction in accordance with a rotation of the Z-knob 125. Reference numeral 126 denotes an objective lens unit, and there are a plurality of types of units in accordance with optical magnification. A revolver 127 has a structure on which is mounted on a plurality of types of an objective lens unit 126, and by rotating the revolver 127, it is possible to select a desired objective lens unit for viewing through the microscope.

The stage 200, which is a stage apparatus, is equipped with a slide 700, and includes an XY-stage that moves in an XY plane including an X-direction and a Y-direction that are orthogonal to each other. The stage 200 has an XY scale plate 210 equipped with high precision scales in X and Y directions for the XY-stage. An X-knob 201 and a Y-knob 202 are knobs for manually moving the stage 200 in an X-direction and an Y-direction respectively. The stage 200 detects the position of the XY stage by reading the X and Y scales (explained later) on the XY scale plate 210 by the X and Y sensors (explained later), and notifies it to the controller 501 via a USB cable 13, for example.

An adapter unit 300 is an adapter for a camera mount, and functions as a mounting portion for mounting the digital camera 400 via a microscope base stand mount 128 to the eyepiece microscope base stand 122. The digital camera 400 is detachably mounted to the microscope body 100 while preserving a predetermined positional relationship with the eyepiece microscope base stand 122 according to the adapter unit 300 and the microscope base stand mount 128. The digital camera 400 captures a microscope image obtained by the microscope body 100. Since the purpose of the digital camera 400 is to record evidence, the controller 501 is connected via a USB interface cable 11 for example, and the digital camera 400 captures an observed image from below the microscope according to an instruction from the controller 501. The captured observed image is displayed on the display 502 under the control of the controller 501. The imaging capabilities of the digital camera 400 include a still image capturing function and a live image capturing function for performing a so-called live-view that displays of an output of an image sensor on a monitor in real-time. The live image capturing function is of a lower resolution than that of the a still image capturing function. Also, the live image capturing function and the still image capturing function are capable of transmitting a captured image (moving image, still image) to an external apparatus via a particular interface (in this embodiment a USB interface).

FIG. 2 (2a) is a perspective view illustrating a configuration of the stage 200 that handles position management. In FIG. 2 (2a), a position management surface stage 220, which is an X-stage, is positioned at the uppermost surface of the stage 200, and moves in the X-direction above a Y-stage 240. The Y-stage 240 moves in the Y-direction on a stage base 260. The stage base 260 is fixed above the Z-base 130 of the microscope body 100. The XY stage is formed by the stage base 260, the Y-stage 240, and the position management surface stage 220. The arrangement of the XY scale plate 210 as well as a slide placement unit 600 are fixed in the position management surface stage 220.

FIG. 2 (2b) is a diagram illustrating the top surface of the position management surface stage 220. In the above described top surface of the position management surface stage 220, the slide placement unit 600 and the XY scale plate 210 are arranged. In the top surface of the XY scale plate 210, an X-area scale 211 includes axis information of an X direction used in position management when there is movement the X direction, a Y-area scale 212 includes axis information of a Y direction used in position management when there is movement in the Y direction, and an XY crosshatch 213 as an X and Y axis alignment standard is formed at extremely high precision. Note, so as to implement the standard of the high precision position management, a material having an extremely low thermal expansion coefficient, for example, a synthetic quartz, is used for the material of the XY scale plate 210 and it is integrally constructed.

Also, in the X-area scale 211, the Y-area scale 212, and the XY crosshatch 213 of the XY scale plate 210, nano technology such as a semiconductor exposure apparatus or the like is used for the manufacture of each pattern. For example, on top of a quartz wafer, the X-area scale 211, the Y-area scale 212, and the XY crosshatch 213 consisting of a collection of lines in the X-axis and the Y-axis are integrally created by nano technology at a precision of 5 nm-10 nm. Note, creation is also possible by drawing the X-area scale 211, the Y-area scale 212, and the XY crosshatch 213 in an exposure apparatus but, ideally, the use of a nano-imprint is realized to lower costs. Subsequently, the XY scale plate 210 cut out in a particular shape by machining. For this, perpendicularity of the X-axis and Y-axis can be formed by a nano level base. Note, it is possible to individually separate, or to individually manufacture, each of the X-area scale 211, the Y-area scale 212, and the XY crosshatch 213, and to arrange them to have a particular positional relationship above the position management surface stage. However, advanced alignment technology for correcting a mechanical error is required for realization thereof, which becomes a cause of an increase in cost.

A dashed region denoted by reference number 205 is a microscope observation target region. An observation target region 205 is a range in which the center position (or the center position of the image sensor of the digital camera 400 (observation position)) of the objective lens is moved relative to the XY stage. The observation target region 205 is of a size that encompasses the slide 700 and the XY crosshatch 213 with leeway. Because of this, in any condition, the slide 700 and the XY crosshatch 213 can fit into the observation target region 205. In other words, not only the slide 700 but also the XY crosshatch 213 are arranged so as to make capturing possible by the digital camera 400 which is an image sensing unit.

Also, in this embodiment, the top-right end of the observation target region 205 is made to be a crosshatch origin point on the XY crosshatch, and this is caused to match with a stage origin point 206. Also, a state in which the center of an objective lens (or the center of an image sensor (observation position)) and the stage origin point 206 match is made to be an XY initialization position (origin point position) of the stage 200. However, it goes without saying that another location may be defined as the stage origin point. Note, the X-axis and Y-axis of the stage coordinates, in other words, a stage X axis 203 and a stage Y axis 204 are parallel to the X and Y axes of the XY crosshatch 213, respectively.

FIG. 2 (2c) illustrates an example of a scale pattern of the X-area scale 211. The X-area scale 211 is formed as a transmissive type diffraction grating by a light transmissive portion and a light blocking portion, in the X direction for detecting position, and the light transmissive portions and light blocking portions are respectively lines of width 2 μm, and such pairs are arranged with a pitch of 4 μm for example. Note, the scale pattern may also be a phase grating for which steps are arranged such that optical path lengths differ periodically. Also, the Y-area scale 212 is a scale pattern in the form of the X-area scale 211 rotated 90 degrees to a Y-axis direction.

FIG. 3 (3a) is a diagram illustrating the Z direction of the positional relationship between the slide 700, the X-area scale 211 on the XY scale plate 210, the Y-area scale 212, and the XY crosshatch 213. As illustrated in FIG. 3 (3a), the position management surface stage 220 and the slide placement unit 600 are designed such that the upper surface of the XY scale plate 210 and the upper surface of the slide 700 are within the same plane at a predetermined precision. As a result, the upper surface of the slide placement unit 600 is lower by the thickness of the slide 700 than the upper surface of the XY scale plate 210. In this way, in this embodiment, the upper surface of the XY scale plate 210 (the X-area scale 211, the Y-area scale 212, and the XY crosshatch 213 arranged on the surface) and the upper surface of the slide 700 are matched (substantially on the same plane). By doing this, the observation surface, in other words, the XY position of the upper surface portion of the slide 700, may be managed with high precision by external position standards (the X-area scale 211 and the Y-area scale 212). The XY crosshatch 213, for representing the X-area scale 211 or the Y-area scale 212, is importantly located within the same plane. Note, in implementation, the upper surface of the XY scale plate 210 (the surface on which the marks are arranged) and the upper surface of the slide 700, may be made to be within a range of approximately 0.5 mm in a Z direction.

The scale pattern of the X-area scale 211 and the Y-area scale 212 is read out by detection sensors fixed in relation to the stage base 260. There are an X-axis sensor 271a, an X-axis intermediary sensor 271b, a Y-axis sensor 272a, and a Y-axis intermediary sensor 272b as detection sensors. The X-axis intermediary sensor 271b and the Y-axis intermediary sensor 272b respectively are arranged on the side of the origin point position with respect to the X-axis sensor 271a and the Y-axis sensor 272a. Note, as described hereinafter, the X-axis sensor 271a and the X-axis intermediary sensor 271b are collectively referred to as the X-axis sensors 271a and b, and the Y-axis sensor 272a and the Y-axis intermediary sensor 272b are collectively referred to as the Y-axis sensors 272a and b.

By the foregoing such structure, an XY coordinate of the stage 200 is obtained directly at a high precision corresponding to the observation position itself. In other words, indirect methods for representing coordinate values by specific single axis coordinates for each axis (the X-axis and the Y-axis) of the XY stage so as to obtain an XY coordinate value of the stage that combines position information for the X direction obtained from a linear encoder of the X-stage and Y position information for the Y direction obtained from a linear encoder of the Y-stage are not used. In this embodiment, movement of the position management surface stage (X-stage) 220 moving in the XY directions is measured directly by the XY scale plate 210. Thus, for example, it is possible to greatly increase position management precision because it is possible to detect by the detection sensors a minute positional misalignment in the Y direction when the position management surface stage 220 moves in the X direction, and a minute positional misalignment in the X direction when the Y-stage 240 moves in the Y direction which accompany a mechanical play or error. There are two methods, as illustrated in FIGS. 3 (3b) and (3c), for a positional relationship of a Z direction of the X-area scale 211 and the Y-area scale 212, the X-axis sensors 271a and b and the Y-axis sensors 272a and b. In FIG. 3 (3b), the first method, the X-axis sensors 271a and b, and the Y-axis sensors 272a and b are arranged on the top side (objective lens side) of the XY scale plate 210. In such a case, it is necessary to arrange a light shielding film 214 at the lower surface of the XY scale plate 210. In FIG. 3 (3c), the second method, the X-axis sensors 271a and b, and the Y-axis sensors 272a and b are arranged on the bottom side (the Z-base 130 side) of the XY scale plate 210. In such a case, the light shielding film 214 is installed at the upper surface of the XY scale plate 210. Note, since the XY crosshatch 213 needs to be observed by the digital camera 400, a light shielding film is not arranged at the position of the XY crosshatch 213.

In the first method, as illustrated in FIG. 3 (3b), the X-axis sensors 271a and b, the Y-axis sensors 272a and b are mounted to a lower surface of a sensor attachment component 208 covering the position management surface stage 220 via an L-type component 207 fixed to the stage base 260. Each detection surface of the X-axis sensors 271a and b and the Y-axis sensors 272a and b faces downward so as to read the Y-area scale 212 and the X-area scale 211 on the position management surface stage 220. In the second method, as illustrated in FIG. 3 (3c), the X-axis sensors 271a and b and the Y-axis sensors 272a and b are mounted so that their detection surfaces are facing upward on the stage base 260, and their detection surfaces are at a predetermined height. The X-axis sensors 271a and b, and the Y-axis sensors 272a and b on the stage base 260 which is positioned lowest, read the X-area scale 211 and the Y-area scale 212, which are highest, from below through a hole of a predetermined size arranged in the position management surface stage 220 and the Y-stage 240. Note that the present invention may be applied to both the method illustrated in FIG. 3 (3b) and the method illustrated in FIG. 3 (3c); however, hereinafter, embodiments will be explained employing the second method illustrated in FIG. 3 (3c).

Note, the XY direction positioning of the X-axis sensors 271a and b, and the Y-axis sensors 272a and b are the same in the first and second methods. The attachment positioning in the Y direction of the X-axis sensors 271a and b is made to be on the X-axis (the stage X axis 203) which passes through a visual field center 170 of the observation field of the microscope and guarantees X direction position detection precision. The attachment positioning of the Y-axis sensors 272a and b is made to be on the Y-axis (the stage Y axis 204) which passes through the visual field center 170 of the observation field of the microscope and guarantees Y direction position detection precision.

FIG. 4 (4a) and FIG. 4 (4b) illustrate the relationship between the XY scale plate 210 and each detection sensor. In this embodiment, an approach of having a plurality of X-axis sensors and Y-axis sensors that read each of the X-area scale 211 and the Y-area scale 212, where an intermediate hand over is performed. By doing this, the size of the area scale can be narrowed, and the miniaturization of the stage 200 is made possible. FIG. 4 (4a) is a case where the visual field center 170 is in the XY initialization position, and FIG. 4 (4b) is a case where the visual field center 170 is in the bottom-left end of the observation target region.

Also, the X-axis sensors 271a and b and the Y-axis sensors 272a and b are fixed on the stage base 260, and are capable of detecting movement of the X direction and the Y direction of the position management surface stage 220 in relation to the stage base 260. The X-area scale 211 is fixed to the position management surface stage 220 which is a movable unit, and is an incremental scale having a width, in the X-axis direction, of a predetermined length shorter than the movable distance in the X-axis direction of the position management surface stage 220. Similarly, the Y-area scale 212 is fixed to the position management surface stage 220 which is a movable unit, and is an incremental scale having a width, in the Y-axis direction, of a predetermined length shorter than the movable distance in the Y-axis direction of the position management surface stage 220. Also, the X-axis sensors 271a and b are arranged in the X-axis direction at an interval smaller than the X-axis direction width of the X-area scale 211, and read the X-area scale 211. Also, the Y-axis sensors 272a and b are arranged in the Y-axis direction at an interval smaller than the Y-axis direction width of the Y-area scale 212, and read the Y-area scale 212. In this fashion, the width (the X direction length) of the X-area scale 211 is slightly (in this embodiment 2 mm) longer than the interval of the X-axis sensors 271a and 271b. Similarly, the width (the Y direction length) of the Y-area scale 212 is slightly (in this embodiment 2 mm) longer than the interval of the Y-axis sensors 272a and 272b. As a result, in this 2 mm space, two X-axis sensors (or two Y-axis sensors) will be present on the X-area scale (or the Y-area scale) simultaneously.

Next, the configuration of the stage 200 will be explained. Firstly, the position management surface stage 220 as the X-stage will be explained with reference to FIG. 5. FIG. 5 (5a) is a top view (a view from the perspective of the objective lens side) of the position management surface stage 220 and FIG. 5 (5b) is a back-side view (a view from the perspective of the Z-base 130 side) of the position management surface stage 220. In this embodiment the position management surface stage 220 includes an X-stage function to move the Y-stage 240 in the X direction.

So that the X-axis sensors 271a and b and the Y-axis sensors 272a and b can access the area scales, apertures 221 and 222 are arranged at positions corresponding to the X-area scale 211 and the Y-area scale 212 of the XY scale plate 210. The sizes of the apertures 221 and 222 are made to encompass the X-area scale 211 and the Y-area scale 212 respectively.

An aperture 223 is provided in a range where a condenser lens aperture 224 moves relative to the position management surface stage 220, in a case that the center of the condenser lens aperture 224 (which has a size slightly larger than the size of a condenser lens unit in which the condenser lens is embedded with leeway) moves relative to the XY stage across the entire region of the observation target region 205. By the aperture 223, the condenser lens unit (the housing in which the condenser lens is embedded) does not interfere with the position management surface stage 220 whatever the position of the observation target region 205 that the position management surface stage 220 moves to.

In the back side of the position management surface stage 220, 2 X-axis cross roller guides 231 are arranged in parallel to the X-axis direction. X-axis cross roller guides 241 are mounted on the Y-stage 240 so as to face X-axis cross roller guides 231 (FIG. 6), and by this, the position management surface stage 220 is slidably supported in the X direction by the Y-stage 240. An X-slider 232 is a moving body of an X-axis drive motor 242 (FIG. 6) embedded in an opposing surface of the Y-stage 240, and the position management surface stage 220 is driven in an X-axis direction by the X-axis drive motor 242. In other words, a linear motor according to ultrasonic waves, for example, is configured by the X-axis drive motor 242 and the X-slider 232.

An X-axis rack gear 233 moves the position management surface stage 220 in the X-direction by a rotation of an X-axis pinion gear 244 on the Y-stage 240 which rotates interworking with the X-knob 201. Note, manual movement in the X direction of the position management surface stage 220 is not limited to the rack and pinion, for example, a wire and pulley system or the like is also possible. In any case, the position management surface stage 220 is movable in the X direction by means of a manual drive and an electric drive in this embodiment. An X-initial position mark 234 corresponds to the X direction position of the stage origin point 206 which is the XY initialization position of the stage 200.

Next, the Y-stage 240 referenced in FIG. 6 will be explained. FIG. 6 (6a) is a top view (a view from the perspective of the position management surface stage 220 side) of the Y-stage 240 and FIG. 6 (6b) is a back-side view (a view from the perspective of the Z-base 130 side) of the Y-stage 240.

In FIG. 6 (6a), the X-axis cross roller guides 241, form a pair with the X-axis cross roller guides 231 arranged on the back-side of the position management surface stage 220, and slidably support the position management surface stage 220 in the X-axis direction. The X-axis drive motor 242 via the X-slider 232 of the position management surface stage 220 moves the position management surface stage 220 in the X direction. The X-axis pinion gear 244 is meshed with the X-axis rack gear 233 arranged at the back-side of the position management surface stage 220, and the position management surface stage 220 moves in the X-axis direction by rotation thereof. Since the X-axis pinion gear 244 rotates in accordance with the rotation of the X-knob 201, a user can move the position management surface stage 220 in the X-axis direction by operating the X-knob 201. An X initial position sensor 243 detects an X initial position mark 234 arranged at the back-side of the position management surface stage 220. In this embodiment, for example, the X-initial position sensor 243 is composed of a transmissive type photo-interrupter, and the X-initial position mark 234 is composed of a light shielding plate for shielding the optical axis of the transmissive type photo-interrupter. The X-initial position sensor 243 and the X-initial position mark 234 configure an origin point detector for detecting the origin point position in the X-axis direction set in the movable range of the position management surface stage 220 which is a movable unit.

An aperture 245 is an aperture for the X-axis sensors 271a and b arranged on the stage base 260 to access the X-area scale 211 via the aperture 221 of the position management surface stage 220. Since the Y-stage 240 moves in the Y direction of the XY directions with respect to the stage base 260, the shape of the aperture 245 extends in the Y direction. Similarly, an aperture 246 is an aperture for the Y-axis sensors 272a and b arranged on the stage base 260 to access the Y-area scale 212 via the aperture 222 of the position management surface stage 220. Also, an aperture 247 corresponds to the region where the condenser lens aperture 224 moves, in a case that the center (the center of the condenser lens) of the condenser lens aperture 224 (which has a size slightly larger than the size of a condenser lens unit in which the condenser lens is embedded with leeway) moved the observation target region 205. Since the Y-stage 240 as described above moves in the Y direction of the XY directions, without extending into the X-axis direction, it has a shape that extends in the Y-axis direction. By the aperture 247, even if the Y-stage 240 moves in the Y direction of the observation target region 205, it does not interfere with the condenser lens unit.

On the back-side of the Y-stage 240 (FIG. 6 (6b)), 2 Y-axis cross roller guides 251 are arranged in parallel to the Y-axis. Cross roller guides which are paired with the Y-axis cross roller guides 251 are mounted to the stage base 260 and, by this, the Y-stage 240 is slidably supported in the Y direction by the stage base 260. A Y-slider 252 is a moving body of a Y-axis drive motor 264 (FIG. 7) embedded in the opposing surface of the stage base 260, and the Y-stage 240 is driven in the Y-axis direction by the Y-axis drive motor 264. A linear motor according to ultrasonic waves, for example, is configured by the Y-axis drive motor 264 and the Y-slider 252.

A Y-axis pinion gear 254 rotates in accordance with the rotation of the Y-knob 202. By the rotation of the Y-knob 202, a Y-axis rack gear 263 (FIG. 7) fixed to the top of the stage base 260 moves in the Y-axis direction. As a result, the user can move the Y-stage 240 in the Y-axis direction by manually are operating the Y-knob 202. Note, manual movement in the Y direction of the stage is not limited to the rack and pinion, and for example, a wire and pulley system or the like is also possible. In any case, the Y-stage 240 is movable in the Y direction by means of a manual drive and an electric drive according to this embodiment. The Y-stage 240, while supporting the position management surface stage 220, moves in the Y direction with respect to the stage base 260. A Y-initial position mark 253 is a mark that is arranged in a position corresponding to the Y direction position of the stage origin point 206.

Next, the stage base 260 will be explained with reference to FIG. 7. FIG. 7 is a top view of the stage base 260 (a view of the stage base 260 from the perspective of the Y-stage 240 side). On the top of the stage base 260, the X-axis sensors 271a and b for reading the X-area scale 211 and the Y-axis sensors 272a and b for reading the Y-area scale 212 are mounted. For each sensor, height is adjusted according to a base (not shown) to become a predetermined distance with respect to the X-area scale 211 and the Y-area scale 212 of the XY scale plate 210 arranged on the position management surface stage 220. Also, as described above, the X-axis sensors 271a and b are arranged on the X-axis passing through the stage origin point 206, and the Y-axis sensors 272*a* and *b* are arranged on the Y-axis passing through the stage origin point 206.

Y-axis cross roller guides 262 form a pair with the Y-axis cross roller guides 251 arranged at the back-side of the Y-stage 240, and slidably support the Y-stage 240 in the Y-axis direction. The Y-axis drive motor 264 is a motor for moving the Y-stage 240 (the Y-slider 252) in the Y direction by electromotion. The Y-axis rack gear 263 moves the Y-stage 240 in the Y direction by the rotation of the Y-axis pinion gear 254. A Y-initial position sensor 265 detects the Y-initial position mark 253 arranged at the back-side of the Y-stage 240. In this embodiment, for example, the Y-initial position sensor 265 is composed of a transmissive type photo-interrupter, and the Y-initial position mark 253 is composed of a light shielding plate for shielding the optical axis of the transmissive type photo-interrupter. The Y-initial position sensor 265 and the Y-initial position mark 253 configures an origin point detector for detecting the origin point position in the Y-axis direction set in the movable range of the position management surface stage 220 which is a movable unit. Also, an aperture 261 corresponds to the condenser lens aperture 224 (which has a size slightly larger than the size of a condenser lens unit in which condenser lens 147 is embedded with leeway). By the aperture 261, the condenser lens unit does not interfere with the stage base 260.

The apertures 261, 247 and 223, along with enabling the condenser lens unit to approach the observation position on the slide from a lower slide surface, also allow light from the light source focused by the condenser lens 147 to pass through. Note, it goes without saying that it is not a problem if the sizes of the apertures for the condenser lens and the X-axis sensors 271*a* and *b* and the Y-axis sensors 272*a* and *b* arranged at each stage in the explanation above are large as long as the strength and precision of the machine are maintained.

Next, the configuration of a drive control of the X and Y-axis directions of the stage 200 will be explained. Note that because the drive control of the Y-axis direction and the drive control of the X-axis direction are realized by the same configuration, hereinafter, the drive control of the X-axis direction will be explained. In FIG. 8, illustrates a block diagram of X-axis control of the stage controller which controls the driving of the stage 200. The stage controller comprises a stage MPU 280 (Micro-processing unit), and a functional configuration indicated within the dashed lines indicates the internal processes of the MPU 280. The X-axis drive motor 242 comprises a coil that is fixed to the Y-stage 240, and causes a magnet (the X-slider 232) fixed to the position management surface stage 220 as the X-stage to move. The coil of the X-axis drive motor 242 is driven by an X-axis drive circuit 282, and drives the position management surface stage 220 in the X-axis direction by moving the X-slider 232.

The X-axis sensor 271*a* and the X-axis intermediary sensor 271*b* read the X-area scale 211 disposed in the XY scale plate 210 on the position management surface stage 220. The output of the X-axis sensor 271*a* and the X-axis intermediary sensor 271*b* is two sinusoidal waves of an A-phase and a B-phase which differ by a 90 degree phase. An analog signal of the two outputted A-phase and B-phase of the X-axis sensor 271*a* are input into a position signal processing circuit 281*a* arranged in the vicinity of the sensor. In the position signal processing circuit 281*a*, by performing a general incremental encoder process and dividing processing to digitize the inputted analog signal, a count value which is a position signal of a resolving power of the scale pitch or less is generated. Similarly, the analog signal of the two outputted A-phase and B-phase of the X-axis intermediary sensor 271*b* are input into a position signal processing circuit 281*b* arranged in the vicinity of the sensor, and converted to a count value which is the position signal. The outputs of the position signal processing circuits 281*a* and *b* are connected to the stage MPU 280 by a serial IF 405 such as a UART and output the position signal according to constant interval requests from the stage MPU 280.

Also, the 2 circuits—the position signal processing circuits 281*a* and *b*—measure the amplitude of the A-phase and B-phase signals of the connected sensor output, respectively, and performs a determination of whether or not the scale can be read by whether they are a predetermined level or less, in other words, whether or not the scale is present over the sensor. A determination result as to the existence or absence of the scale is sent to the stage MPU 280 as a scale existence or absence signal for each position signal at the same time that the position information is sent by the serial IF 405. Regarding a structure of the data sent by the serial IF 405, for example, information of 4 Bytes (32 bits) in total—3 Bytes (24 bits) of code attached position information and 1 byte (8 bits) of status information is exchanged. The status information includes, an ID indicating which sensor the position came from (2 bits), a scale existence/absence determination logical value (1 bits), and also an error signal (5 bits).

The position signals of the 2 output position signal processing circuits 281*a* and *b* sent by the serial IF 405 become a combined position signal by a position signal combining unit 404 within the stage MPU 280 and are output to a subtractor 402. A target position generation unit 401 inputs the signals of the X-initial position sensor 243 as an origin point sensor that detects the origin point position of the X direction, a position signal sent by the serial IF 405, and an instruction of the movement destination the position management surface stage 220 from the controller 501 via a communication unit 408. The target position generation unit 401, for example, outputs the target position specified from the controller 501. The subtractor 402 subtracts a current position which is an output of the position signal combining unit 404 from the target position outputted from the target position generation unit 401. To the output of the subtractor 402, in a drive signal processing unit 403, a filter calculation such as PID is applied, and that is output as an analog signal at a constant period by a DA converter (not shown) or the like of the stage MPU 280, and input to an X-axis drive circuit 282. The process up to this point is performed within the interval of one cycle in constant intervals. The X-axis drive circuit 282 drives an X-axis drive motor in accordance with a signal from the drive signal processing unit 403. Thus, the position management surface stage 220 moves to the target position. Note, the position signal combining unit 404 transmits the position of the position management surface stage 220 obtained based on the signals of the X-axis sensor 271*a* and the X-axis intermediary sensor 271*b* to the controller 501 via the communication unit 408. The communication unit 408 is connected to the controller 501 by the USB cable 13, for example.

Next, internal processing of the position signal combining unit 404 will be explained. The position signal combining unit 404 performs a process to handover a read value of the scale from the 2 sensors (the X-axis sensors 271*a* and *b*) and performs single continuous position output. The handover processing differs before and after the stage origin point detection processing, and after the origin point detection processing, the handover is performed at a predetermined position from the origin point of the stage (a predetermined count value). In the handover, by adding an increment from the handover position of the sensor output after handing over to the sensor position output prior to the hand over, the position signal is made to be continuous. Also, before detecting the origin point of the stage, the above described determination result as to the existence or absence of the scale (sent by the position signal processing circuits 281a and b) is used to perform connection process. Details will be described later along with an origin point detection sequence.

As described above, the X-initial position sensor 243 which is an origin point sensor of the X-axis direction is composed of a transmissive type photo-interrupter and is fixed on the Y-stage 240. The origin point position of the position management surface stage 220 is detected by a light shielding plate mounted to a side of the position management surface stage 220 (the X-initial position mark 234) blocking the optical path of a transmissive type photo-interrupter. Note, for the position of the origin point, the visual field center 170 is set to a position such that the state becomes as in FIG. 4 (4a).

Next, an operation of the target position generation unit 401 will be explained. When the target position is set from the controller 501, the target position generation unit 401 sets an acceleration and deceleration plan as shown in FIG. 9 (9a) in accordance with the distance to the target position. The acceleration and deceleration plan is configured by an acceleration time period, a period of constant speed, and a deceleration time period, for example. The period of constant speed, for example, sets a constant speed value of an appropriate speed in a range in which a reading accuracy of the scale is maintained. From a stopped state to the constant speed, the speed accelerates at a constant acceleration. Also, from a state of the constant speed to stopping, the speed is reduced to a stop at a constant acceleration. When a constant speed and an acceleration are set to be predetermined values respectively, a distance moved in the acceleration time period (d1), a distance moved in the period of constant speed (d2), and a distance moved in the deceleration time period (d3) are determined, and the sum total of these moving distances (d1+d2+d3) becomes a movement distance from the target position. This is as in FIG. 9 (9b) when illustrated. FIG. 9 (9b) illustrates a relationship of a moving time with a moving distance.

FIG. 9 (9b), by the target position generation unit 401 dynamically outputting the values on a curve which is a control curve representing the control target position at the time of stage movement control until a final target position, precise movement control of the stage is made, and the movement to the final target position is accomplished. Movement control is performed at a position in accordance with being able to grasp the value (moving distance) of the position with high precision by the read value of the scale (time management does not become high precision). Note, FIG. 9 (9a) is a trapezoid drive, however, when the distance to the target position is short, it becomes a triangle drive that does not have a fixed speed portion (the dashed-dotted line of FIG. 9 (9a)). The drive control of the position management surface stage 220 of the Y-axis direction is arranged in the same way as the control of the X-axis direction. However, the stage MPU 280 may be a combination of the X-axis and the Y-axis.

Next, a sequence of movement control in the origin return of the present embodiment will be described using FIG. 10 and FIG. 11. FIG. 10, is a figure simply showing an easily understood movement of the position management surface stage 220 (the XY scale plate 210) in the X-axis direction from the perspective of the front surface of the stage (Y-axis direction). As described above, the X-area scale 211 is formed above the XY scale plate 210. The XY scale plate 210 is above the position management surface stage 220, but is omitted for explaining the movement of the X-axis direction with respect to the stage base 260 in this figure. Also, the Y-stage 240 is omitted for the same reason. Above the stage base 260, the X-axis sensor 271a and the X-axis intermediary sensor 271b are fixed. The X-initial position sensor 243 is fixed above the Y-stage 240 (not shown) as an origin point sensor, however, since it does not move in the X-axis direction, from the perspective of the front surface (Y-axis direction), it is always in the same position with respect to a position management stage base 158.

In the state immediately after turning on the power of the stage, four states of FIGS. 10—(10a) to (10d)—are considered. FIG. 10 (10a) illustrates a case were the XY scale plate 210 is at the origin point. This is a case in which, as illustrated in FIG. 4 (4a), the visual field center 170 is a position so to become the origin point of the XY scale plate 210, and is a position at which a light shielding plate on the position management surface stage blocks the X-initial position sensor 243, which is a photo-interrupter. Also, FIG. 10 (10b) illustrates a case of the XY scale plate 210 from the perspective of above the X-axis sensor 271a. Also, FIG. 10 (10c) illustrates a case where the XY scale plate 210 is above both the X-axis sensor 271a and X-axis intermediary sensor 271b. Additionally, FIG. 10 (10d) illustrates a case where the XY scale plate 210 is only above the X-axis intermediary sensor 271b.

FIG. 10 (10e) is a figure that illustrates two values of an existence/absence signal for the scale above the X-initial position sensor 243 and the X-axis intermediary sensor 271b and an existence/absence signal for the scale above the X-axis sensor 271a. The output of the origin point sensor in the case that the X-initial position mark 234 (the light shielding plate) on the position management surface stage 220 is in a position blocking the X-initial position sensor 243 which is a photo-interrupter is an H-level, and otherwise it is represented as a L-level. Also, regarding the 2 of the X-axis sensors 271a and b, cases when the scale is above the sensor is represented as the H-level and cases where it is no are represented as the L-level. The scale existence or absence signal represents a determination result of the existence or absence of the scale. Also, in the bottom part, the a region illustrates a region where the X-initial position sensor 243 is the H-level (the state of FIG. 10 (10a)). Also, a b region illustrates where the X-axis intermediary sensor 271b is the L-level, and the X-axis sensor 271a is the H-level (the state of FIG. 10 (10b)). Also, a c region illustrates a region where the X-axis intermediary sensor 271b and the X-axis sensor 271a are both the H-level (the state of FIG. 10 (10c)). Also, a d region illustrates where the X-axis intermediary sensor 271b is the H-level, and the X-axis sensor 271a is the L-level (the state of FIG. 10 (10d)). In a case of any of these states, when proceeding in the rightward direction (a direction away from the origin point) of FIG. 10, the position count value increases and is assumed to move decreasingly in an opposite case.

Here, the movement of each region prior to an origin point detection of the position signal combining unit 404 is explained. After power activation, the position signal combining unit 404, by the stage MPU 280 executing a particular program, enters an origin point detection mode, and a connection is performed depending on the signal for determining the existence or absence of the scale that the X-axis sensor 271*a* and the X-axis intermediary sensor 271*b* output. From a state in which only one of the sensors of the X-axis sensors 271*a* and *b* are above the scale, when it changes to a state in which the 2 sensors are above the scale, the position signal combining unit 404 obtains a position signal by the adding the output positions of the sensor that newly become on the scale to the immediately preceding position signal.

For example, a case in which initially the state of FIG. 10 (10*b*) became the state of FIG. 10 (10*c*) is explained. If the position management surface stage 220 is moved in the origin point direction from the state shown in FIG. 10 (10*b*), the direction becomes such that the read position according to the X-axis sensor 271*a* decreases. Since the read position becomes 0 when power activation occurs, the position becomes negative by movement in the origin point direction. When the state of FIG. 10 (10*c*) is entered, in other words, from when a scale existence or absence signal of the X-axis intermediary sensor 271*b* changes to scale exists (H-level), the position of the X-axis intermediary sensor 271*b* similarly becomes negative. As a result, if the position read by the X-axis sensor 271*a* at the moment when the scale existence or absence signal of the X-axis intermediary sensor 271*b* changed from L-level to H-level is added to the read position of the X-axis intermediary sensor 271*b*, it becomes position information from the position at the time of power activation. Similarly, from the state of FIG. 10 (10*d*), in a case when the state becomes that of FIG. 10 (10*c*), the position that is read by the X-axis intermediary sensor 271*b* becomes positive. Therefore, from the moment that the state becomes that of FIG. 10 (10*c*), in other words, when the scale existence or absence signal of the X-axis sensor 271*a* changes to scale exists (H-level), the read position of the X-axis sensor 271*a* also becomes positive. As a result, if the read position of the X-axis sensor 271*a* is added to the read position by the X-axis intermediary sensor 271*b* when the scale existence or absence signal of the X-axis sensor 271*a* changed to scale exists (the H-level), it results in position information from the position at the time of power activation.

Next, the sequence of origin point detection by the stage MPU 280 will be explained using the flowchart of FIG. 11. Note, an operation in the X direction for the origin return of the position management surface stage 220 is explained below, however, the operation may also be similarly executed in the Y direction. The origin return below is executed in the case that the position of the position management surface stage 220 becomes indefinite and most typically is executed during power activation. However, the origin return may be executed in a case when the reading value of the scale enters a reset state for some reason. Alternatively, this may also be executed if an origin return instruction operation by a user is detected.

After power activation, the stage MPU 280 first confirms (step S51) whether or not the position management surface stage 220 is detected by the X-initial position sensor 243 as the origin point sensor (whether or not in the range of the origin point sensor). In this embodiment, while the X-initial position sensor 243 is light-shielded by the light shielding plate which is a transmissive type photo-interrupter, the output of the X-initial position sensor 243 becomes the H-level. Accordingly, whether or not the status is of FIG. 10 (10*a*) is confirmed by whether or not the output of the X-initial position sensor 243 is at the H-level. In a case when within the range of the origin point sensor, since the origin point may be located at low-speed (a time of a switching from the H-level to the L-level), the process proceeds to step S55. From these conditions, the stage MPU 280 repeats (step S56) the process for performing the origin point detection while moving the position management surface stage 220 (step S55) at a low speed toward the origin point (right direction in case of FIG. 10(10*a*)). In this embodiment, at the timing that the signal from the X-initial position sensor 243 switches from the H-level to the L-level, the position management surface stage 220 becomes the origin point position, and the process proceeds to step S57. Note, configuration may be taken such that after a change from the H-level to the L-level is detected, the position management surface stage 220 moves in the origin point direction again, and a position at which the signal from the X-initial position sensor 243 is switched from the L-level to the H-level is made to be the origin point position.

Meanwhile, if it is determined that the origin point sensor is not within range in step S51, the stage MPU 280 performs a check of the scale existence or absence signal of the X-axis sensor 271*a* to check whether or not the scale exists (H-level) (step S52). This can be checked by the serial signal of the X-axis sensor 271*a* input from the serial IF 405. If the scale exists above the X-axis sensor 271*a* (the scale existence or absence signal is at the H-level), the stage MPU 280 performs an additional check of the scale existence or absence signal of the X-axis intermediary sensor 271*b* to check whether or not the scale is present (H-level) (step S53). This is also input from the serial IF 405, and can be checked by the serial signal of the X-axis intermediary sensor 271*b*.

By step S53, if it is determined that the scale exists (the scale existence or absence signal is at the H-level) above the X-axis intermediary sensor 271*b*, the scale is in the state of FIG. 10 (10*c*). In other words, the position management surface stage 220 as the movable unit is in a position that at which the X-area scale 211 can be read by both the X-axis sensor 271*a* and the X-axis intermediary sensor 271*b*. Since the distance between the X-axis sensor 271*a* and the X-axis intermediary sensor 271*b* is a slightly (in this embodiment, for example, 2 mm is used) smaller distance than the width of the X direction of the X-area scale 211, the position of the XY scale plate 210 of this state is limited within a certain degree of precision. As a result, the distance from this state to the origin point is determined within a certain degree of precision (for example, under 2 mm) by a design value. Accordingly, from the distance to the origin point position in a case where the position management surface stage 220 is in a state, of the states of the X-area scale 211 detected by both of the X-axis sensor 271*a* and the X-axis intermediary sensor 271*b*, closest to the origin point position, a distance from which a mechanical variation for the origin point position is subtracted is set beforehand as a predetermined distance. Here, the distance to the origin point position in the case of the state closest to the origin point position is the distance from the position immediately preceding the change of the scale existence or absence signal of the X-axis sensor 271*a* from the H-level to the L-level to the origin point, in other words, the distance of the region d illustrated in FIG. 10 (10*e*).

The stage MPU 280 sets a position for which the predetermined distance set as described above is subtracted from the current position that the X-axis intermediary sensor 271*b* outputs to the target position. Thus, the stage MPU 280 performs position control using an output of the X-axis intermediary sensor 271*b*, and moves the position management surface stage 220 at a high speed to the target position by the trapezoid drive as shown in FIG. 9 (9*a*) (step S54). In other words, the position management surface stage 220 moves a predetermined distance in the direction of the origin point position. At that time, an X direction position of the position management surface stage 220 is obtained by the X-axis intermediary sensor 271*b*.

Because the distance set in step S54 (the target position) is always a distance before the origin point, there is no situation in which the origin point is exceeded and the device is damaged by bumping into the mechanical end portion. When the high speed movement completes in step S54, the state becomes such that the position management surface stage 220 is stopped in front of the origin point. From these conditions, the stage MPU 280 repeats (step S56) the process for performing the origin point detection while moving the position management surface stage 220 (step S55) at a low speed in the direction to the origin point. In other words, until it is detected that the position management surface stage 220 has reached the origin point position by the X-initial position sensor 243, the position management surface stage 220 will move at a lower speed than the movement in step S54. If there is change in the signal from the X-initial position sensor 243 (from the L-level to the H-level, or the opposite), the position management surface stage 220 stops movement as the origin point position is detected. Therefore, the stage MPU 280 initializes (the counter is set to 0) the position counters according to the X-axis sensors 271*a* and *b* at the origin point detection point, and the origin point detection is terminated (step S57).

Next, a case of a confirmation of whether or not the scale existence or absence signal of the X-axis intermediary sensor 271*b* of step S53 is scale exists (H-level) or scale does not exist (L-level) will be explained. In this case, the scale is in the state of FIG. 10 (10*b*), and is in a state where there only is the X-axis sensor 271*a* above the scale. In such a case, the stage MPU 280 starts high speed movement of the position management surface stage 220 in the direction of the origin point without establishing a target position (step S58). Note that a position of the position management surface stage 220 is obtained by the X-axis sensor 271*a*. In other words, the acceleration by the acceleration of the trapezoid drive of FIG. 9 (9*a*) is started, and a drive to move the position management surface stage 220 is performed so as to perform a constant speed drive if the speed reaches Vmax.

The stage MPU 280, while moving the position management surface stage 220, performs confirmation of whether or not the X-axis intermediary sensor 271*b* is above the scale (step S53). Here, the difference from the case of transitioning from step S52 to step S53 is that the position management surface stage 220 is already moving at a high speed. When the X-axis intermediary sensor 271*b* is detected to be above the scale (the scale existence or absence signal is at the H-level), the approximate distance to the origin point position is understood. The stage MPU 280 makes a switch from a high speed movement where the target is not set to a high speed movement according to the reading of the position using the X-axis intermediary sensor 271*b* for which a predetermined position is made to be the target, and the position management surface stage 220 move to in front of the origin point (step S54). Hereinafter, processing is performed as explained before in step S55, step S56, and step S57, and then terminates.

Next, a case in which the X-axis sensor 271*a* outputs scale does not exist (L-level) in step S52 is explained. In such a case, the stage MPU 280 performs confirmation of whether or not the scale existence or absence signal of the X-axis intermediary sensor 271*b* is scale exists (H-level) (step S60).

Here, a case where it is determined that the scale does not exist is in fact a state that never occurs, and an error termination is performed because there is a possibility that some kind of problem as arisen (step S59).

In a case that it is determined that the scale exists from the scale existence or absence signal of the X-axis intermediary sensor 271*b*, it is the state of FIG. 10 (10*d*), and only the X-axis intermediary sensor 271*b* is above the scale. In this state, high speed movement towards the origin point is a risk, since it is not known how much distance there is from the current position of the position management surface stage 220 to the origin point position. Meanwhile, if it is the opposite direction to the origin point, there is a long movable range. Accordingly, the stage MPU 280, while performing high speed movement in the opposite direction of the origin point without establishing a target position (step S61), confirms whether or not the scale existence or absence signal of the X-axis sensor 271*a* is scale exists (H-level) (step S62). If the X-axis sensor 271*a* is not above the scale (L-level), high speed movement continues (step S61). When the scale existence or absence signal of the X-axis sensor 271*a* is scale exists (H-level), immediately a deceleration process is performed stopping movement of the position management surface stage 220 (step S63). Initially, having been at any position, since the speed while moving at a high speed is different, or, since the position stopped at by the deceleration process is different, a stop position of the position management surface stage 220 enters the state of FIG. 10 (10*c*) or FIG. 10 (10*b*). As a result, as the process proceeds to step S53, and as described above, the process for the origin return based on the current position of the position management surface stage 220 is performed.

As described above, by virtue of the stage apparatus and the method of controlling the stage of the embodiment, whatever state the initial position of the stage is in at the time of power activation, it is possible perform a high speed movement to in front of the origin point and switch to a low speed to perform an origin point detection. As a result, it is possible to execute at a high precision the high speed origin point detection. Also, in this embodiment, using a plurality of sensors to read a value of the scale by handover, the approximate distance up to the origin point of the position management surface stage 220 is determined, a movement is performed at a high speed to the origin point vicinity, and high precision origin point detection is performed at a low speed after movement to the origin point vicinity. For this, without adding a special configuration for the origin return, an origin point detecting operation can be performed at a high speed and accurately. Because of this, it is possible to shorten the time that the position management surface stage 220 can be used, for example, shortening a start up time of the microscope during power activation.

Note, in the above described embodiment, regarding the explanation of the origin return of the X-axis direction, it is similar for the Y-axis direction as well. Also, in the above described embodiment, the position signal process of the X-axis sensors 271*a* and *b* is performed for each sensor, and limitation is not made to sending the position signal by serial IF to the stage MPU 280. For example, as shown in FIG. 12, an analog output of each of the X-axis sensors 271*a* and *b* may be converted to a digital signal by an AD converter 407 of the stage MPU 280, and processed by a position signal processing unit 406. In such a case, external processing circuitry can be reduced and cost reduction becomes possible.

As in other embodiments, in a case where it a high speed movement is made (for example, Vmax: a maximum speed that can be executed safely) until the X-initial position sensor 243 detects the X-initial position mark 234, and the X-initial position sensor 243 detects the X-initial position mark 234, a rapid deceleration may be performed. In such a case, as the stage is caused to stop by rapid deceleration, the X-initial position mark 234 becomes a position separated only by predetermined distance Δ from the position detectable by the X-initial position sensor 243. For that reason, the stage is returned to a position at which the X-initial position sensor 243 can detect the X-initial position mark 234. When a− is made to be the acceleration for causing the deceleration of the stage, the X-initial position sensor 243 detects the X-initial position mark 234 from an elapsed time after the stage has stopped t1=Vmax/|a−|. As a result, afterwards, by moving the stage in the opposite direction from up until that point by the distance Δ=(Vmax^2)/2|a−|, the origin return is realized. Here, the size of the acceleration of a− can realize the origin return at a high speed by setting the maximum acceleration that can be applied (note that in actuality a− takes a negative value). At least, as compared with a case where the position of the origin point as in the embodiments described above (for example, referring to FIG. 9) cannot be accurately specified, since it is possible to have more rapid deceleration, such control contributes to an increase in speed of the origin return. By moving the stage by such control, there is a possibility that the origin return can be performed faster than in the embodiment as described above. Note that in such a case, it is necessary to satisfy a mechanical requirement of being able to move the stage in a range of at least ±Δ from the origin point relative to the x direction.

Note, as described above, the control (hereinafter, "specific control") performed in the X direction causes the X-initial position mark 234 to move at a high speed to the position of the X-initial position sensor 243, however, limitation is not made to this, and the specific control as described above may also be performed in the Y direction. Also, in a different embodiment, for the Y direction, sensors are arranged in a plurality as in the above described embodiment, however, regarding the X direction, the specific control is performed, and, sensors are not arranged in a plurality as in the above described embodiment, though one sensor may be configured (a configuration in which the connection is not performed). In short, the specific control, from the relationship of the positional relationship between the origin point and the movable range of the stage, the magnitude of the acceleration at which the stage is caused to move, the maximum moving speed of the stage, and the like, may be used as appropriate.

Also in a different embodiment, the specific control described above is realized in a different form. The specific control described above is something in which in accordance with the X-initial position sensor 243 detecting the X-initial position mark 234 the stage is rapidly decelerated, and the stage is caused to move in an opposite direction up until that point. In contrast to this in the present embodiment, if the X-initial position sensor 243 has detected other marks in a known positional relationship with the X-initial position mark 234, the stage is caused to rapidly decelerate. Here, as the known positional relationship, the distance between the X-initial position mark 234 and relevant other marks can be made to be a known value Δ'. In this way, where it is necessary to move the stage at least 2Δ after the rapid deceleration in the specific control described above, it is possible to recover to the origin point by moving at least Δ' after rapid deceleration. If 2Δ is a smaller value than Δ', then the specific control described above can realize the origin return at a higher speed. When the relevant Δ' is of a slightly larger value than the distance Δ described above, an origin return can be made to increase in speed. The distance Δ' between the X-initial position mark 234 and the relevant other marks approaches closer than Δ approaches, so the time required for origin return can be shorter. In this embodiment, it ceases to be necessary to satisfy the requirement of "being able to move the stage in a range of at least ±Δ from the origin point relative to the X direction" as was necessary in the above specific control. Note, sensors that detects the relevant other marks may also be arranged separately to the X-initial position sensor 243. On the other hand, there is merit in that it is possible to realize a control of an origin return at high speed with the specific control described above without increasing a number of marks or sensors.

Note, in the above described embodiment, the stage apparatus applied to the microscope described is not limited this. The present invention is applicable if the stage apparatus performs position management by reading an incremental scale by sensor. Also, in the above described embodiment, configuration is taken to mount the X-axis sensor and the Y-axis sensor to the stage base 260, and read the X-area scale 211 and the Y-area scale 212 formed on the shared XY scale plate 210, but limitation is not made to this. For example, it is possible to apply the present invention to a normal XY-stage that is equipped with a sensor that reads the scale of the X-stage on the Y-stage, and is equipped with a sensor that reads the scale of the Y-stage on the base stage.

Also, in the above described embodiment, the X-axis sensor 271a and the X-axis intermediary sensor 271b (a Y-axis sensor 272a and a Y-axis intermediary sensor 272b) that hand over the reading of the area scale are used for implementing speed control as illustrated in FIG. 10, but limitation is not made to this. Two sensors arranged so that it is possible to turn the signal on and off in accordance with the position of the stage, as illustrated in FIG. 10 (10e), may be used.

By virtue of the first embodiment a high speed and high precision recovery to the origin point position can be realized in the stage apparatus.

Second Embodiment

The second embodiment relates to controlling the position of the moving body by the stage apparatus. In particular, a stage apparatus for setting an origin point by controlling the position of the moving body and a method of controlling the same are explained.

Hereinafter, referring to the attached figures, in the stage apparatus according to embodiments of the present invention, a movement operation (origin return operation and origin point movement operation) to an initial position of the moving body referring to the attached figures is explained.

FIG. 13 is a block diagram for explaining a functional configuration of the stage apparatus in the embodiment. The stage apparatus includes an MPU 1100, a driving circuit 1200, and a mechanical unit 1300, and moves a moving body in a predetermined axial direction in the mechanical unit 1300. The MPU 1100, by executing a program stored in a memory 1107, realizes various control comprising each functional unit illustrated in FIG. 13. In the MPU 1100, a speed plan calculation unit 1101 creates (a track calculation) a speed plan (an acceleration and deceleration plan) of a moving body 1301 using a parameter set in advance, and a target value of a position or a speed. Also, the speed plan calculation unit 1101, when a limit detection signal (hereinafter referred to as a detection signal) from a limit detector 1306 described later is input, generates the acceleration and deceleration plan (deceleration track) for causing the moving body to stop. A position signal processing unit 1104 processes the position signal fed back from the mechanical unit 1300, and a speed detection unit 1103 calculates the moving speed of the moving body using the position signal processed by the position signal processing unit 1104, and a sampling period or an internal clock of the MPU 1100. Subtractors 1105 and 1106 obtain a deviation between the acceleration and deceleration plan, and the current speed and the current position. A drive signal processing unit 1102 performs a calculation of a PID control or the like from a deviation obtained from the subtractors 1105 and 1106, and determines a manipulated variable with respect to the driving circuit 1200.

The driving circuit 1200 drives the mechanical unit 1300 in accordance with a manipulated variable input from the drive signal processing unit 1102. FIG. 14 is a perspective view illustrating configuration of the mechanical unit 1300. As illustrated in FIG. 14 (14a), the mechanical unit 1300 configures the stage apparatus to move the moving body 1301 in a predetermined axial direction. The mechanical unit 1300 is equipped with the moving body 1301, a scale plate 1302, a base plate 1303, magnet shaft support portions 1304 and 1305, limit detectors 1306 and 1307 (the sensor of the transmissive type photo-interrupter in the present example), a magnet shaft 1308, and a rail 1309. The scale plate 1302 comprises a scale pattern 1316 for position detection. One of the limit detectors 1306 and 1307 (the limit detector 1306 in this embodiment) also handles the role of the origin point sensor. The movement direction of the moving body 1301 in this embodiment is for movement in the positive direction to the side of the limit detector 1306 and for movement in the negative direction to the side the limit detector 1307.

As illustrated in FIG. 14 (14b), the moving body 1301 is equipped with a table 1310, a sensor unit 1311, a coil unit 1312, light shielding plates 1313 and 1314 (referred in FIG. 15), and a slider 1315. The sensor unit 1311 comprises a sensor for reading the scale pattern 1316, and the sensor unit 1311 detects a position of the predetermined axial direction of the moving body 1301 by reading the scale pattern 1316. A detected position is output by the sensor unit 1311 as a position signal.

As illustrated in FIGS. 15 (15a) and (15b), in the mechanical unit 1300, by a current being input into the coil unit 1312, a force is generated for moving the moving body 1301 with respect to the magnet shaft 1308, and with this the moving body 1301 moves along the rail 1309. Also, the position of a moving body 1301 is consecutively measured by the scale plate 1302 and the sensor unit 1311. The limit detectors 1306 and 1307 are each a transmissive type photo-interrupter including a light emitter and receiver, and detect a moving body 1301 by light shielding plates 1313 and 1314 blocking the optical path between the light emitter and receivers. The limit detectors 1306 and 1307 output a detected signal (Hi-level) within a predetermined distance (L0) between the magnet shaft support portions 1304 and 1305 and the coil unit 1312. The detection signal is at a Hi-level when the light shielding plate blocks the optical path of the transmissive type photo-interrupter, and otherwise it indicates a Low-level. The position signal from the sensor unit 1311 is fed back to the position signal processing unit 1104 of the MPU 1100, and the detection signal from the limit detectors 1306 and 1307 is fed back to the speed plan calculation unit 1101 of the MPU 1100.

FIG. 16 is a flowchart illustrating a movement operation (namely, an origin return operation and an origin point movement operation) to an initial position of a moving body 1301 in the mechanical unit 1300. The limit detectors 1306 and 1307, which are comprised by a transmissive photo interrupter, detect light-shielding by the light shielding plates 1313 and 1314 as described above. Because of this, the limit detectors 1306 and 1307, from the mechanical limit which is the position of a mechanical movement limit of the moving body 1301, detect that the moving body 1301 in the range of the predetermined distance L0 has been reached. As illustrated in FIG. 15 (15a), in the present example, the position (the mechanical limit) of the movement limit is a position at which the coil unit 1312 and the magnet shaft support portion 1304 or 1305 interfere.

In step S1401, the MPU 1100, when an origin return operation or an origin point movement operation is instructed, determines whether or not the limit detector 1306 detects the moving body 1301 (whether the output of the limit detector 1306 is Hi-level or Low-level). If the output of the limit detector 1306 is Low-level, specifically, in a case when the distance from the mechanical limit to the moving body 1301 is L0 or more, the processing proceeds to step S1402. Meanwhile, if the output of the limit detector 1306 is Hi-level, specifically, in a case when the moving body 1301 is at a position that is within L0 from the mechanical limit, the process proceeds to step S1701 (FIG. 19).

In step S1402, the speed plan calculation unit 1101, obtains a moving speed that can stop the moving body 1301 within the predetermined distance by decelerating the moving body 1301 at a predetermined rate of deceleration. In this embodiment, the speed plan calculation unit 1101, obtains a speed vm from the acceleration α and the distance L0 from the detection point where the output of the limit detector 1306 becomes the Hi-level to the mechanical limit by Equation (1).

$$\text{maximum speed } vm = \sqrt{(2 \times L0 \times \alpha)} \quad (1)$$

A maximum speed vm, when the output of limit detector 1306 becomes Hi-level, is the maximum speed at which the moving body 1301 can stop without contacting the mechanical limit. In other words, it is possible to cause the moving body 1301 to stop in a range in which it does not interfere with the mechanical limit in a case where movement of the moving body 1301 is controlled based on the detection signal of the limit detector 1306 if the moving body 1301 can be caused to move at a speed that does not exceed the maximum speed vm. As a result, without causing the moving body 1301 to interfere with the mechanical limit, a shortening of the time period for recovery to the initial position is possible.

Next, the MPU 1100 executes first movement processing that moves the moving body 1301 toward the limit detector 1306 with the moving speed vm as a target, and causes the moving body 1301 to stop within the distance L0 in accordance with the limit detector 1306 detecting the moving body 1301. The first movement processing corresponds to step S1403 through step S1407.

First, in step S1403, the speed plan calculation unit 1101 causes the moving body 1301 to move in the positive direction, performing an acceleration at the acceleration α until the maximum speed vm, and generates a speed plan to control the speed to maintain the speed vm in a case when maximum speed vm is reached, to cause the moving body 1301 to move. The speed plan calculation unit 1101, during movement of the moving body 1301, monitors whether or not the output of the limit detector 1306 becomes Hi-level (step S1404). When the output of the limit detector 1306 becomes Hi-level, the process proceeds to step S1405, and records the position detected at that point in time by the position signal processing unit 1104 to the memory 1107. To explain step S1405 more concretely, the position signal processing unit 1104, when the edge triggers a switch (a rise) of the output of the limit detector 1306 to Hi-level, a current position Pnow is stored in the memory 1107 as a detection position Plim. Note, the current position Pnow is consecutively measured by the scale pattern 1316 and the sensor unit 1311. After that, the speed plan calculation unit 1101 generates a speed plan and causes deceleration (step S1406) of the moving body 1301 by negative acceleration α (step S1407) to stop.

After the first movement processing (step S1403 through step S1407) as above completes, the MPU 1100 performs an origin return or origin point detection operation by returning the moving body 1301 to a position (the origin point position) at which the status of the detection of the moving body 1301 by the limit detector 1306 switches. The process is illustrated by step S1408 through step S1417. In this embodiment, a position where the status of the detection of the moving body 1301 by the limit detector 1306 switches, in other words the origin point position, is made to be a position at which the status of the detection by the limit detector 1306 switches from Hi (a state in which the moving body 1301 is detected) to Low (a state in which the moving body 1301 is not detected). However, this is not limited to the origin point position, and the opposite is also acceptable. In other words, the position may be made to be the origin point position where the status of the detection by the limit detector 1306 is switched from Hi (a state where the moving body 1301 is detected) to Low (a state where the moving body 1301 is not detected).

After the first movement processing (step S1403 through step S1407), in step S1408 and step S1409, the MPU 1100 executes second movement processing moving the moving body to a limit detection position stored in the memory 1107. First, in step S1408, the speed plan calculation unit 1101 generates a speed plan for moving the moving body 1301 from the current position Pnow to the detection position Plim stored in the memory 1107. Then, in step S1409, the speed plan calculation unit 1101, in accordance with the generated speed plan, moves the moving body 1301 with the storage position Plim as a target value. Note, the speed plan calculation unit 1101, determines the speed plan of the moving body 1301 based on the parameters which are obtained as moving distance Pm=|Pnow−Plim|, target speed v1=sqrt(Pm×α), and the acceleration α.

When the above described second movement processing (step S1408 and step S1409) completes, the MPU 1100 executes third movement processing (step S1414-step S1416) if the limit detector 1306 detects the moving body 1301 (YES in step S1410) as a result of the second movement processing. In the third movement processing, the moving body 1301 moves in a direction away from the position of the movement limitation, and the limit detector 1306 is stopped at a position where the moving body 1301 ceases to be able to be detected (NO in step S1415). Meanwhile, the result of the second movement processing, in a case that the limit detector 1306 does not move the moving body 1301 (step S1410), the MPU 1100 moves the moving body 1301 until detected by the limit detector 1306 (step S1411 through step S1413). The MPU 1100, after moving the moving body 1301 until detected by the limit detector 1306 (step S1412 is YES) and the moving body 1301 is stopped (step S1413), executes the third movement processing described above (step S1414 through step S1416). In this way, movement to the origin point position of the moving body 1301 is completed, and the MPU 1100 determines the position of the moving body 1301 of that time to the origin point (step S1417).

Below, step S1410 through step S1416 will be explained in detail. In step S1409, if the output of the limit detector 1306 is Hi-level (if the moving body 1301 is detected) after the moving body 1301 moves to the detection position Plim, the process proceeds from step S1410 to step S1414. In step S1414, the MPU 1100 moves the moving body 1301 by a low speed feed in the negative direction or by a step feed operation. Therefore, when the output of the limit detector 1306 becomes Low-level, the process proceeds from step S1415 to step S1416 and the MPU 1100 stops movement of the moving body 1301. For example, in step S1414 and step S1415, configuration is such that the MPU 1100 moves the moving body 1301 by a predetermined distance according to the step feed, for example, and determines whether or not the limit detector 1306 detects the moving body 1301 for each movement. The shorter the predetermined distance for which the step feed was performed, the higher the precision of the origin point position becomes, but more time for the movement will be required. Also, in step S1414, even in a case when a low speed movement is used, while the precision of the origin point position will increase the lower the movement speed of the moving body 1301 is made to be, more time will be required for the movement.

Meanwhile, if the output of the limit detector 1306 is Low-level (if the moving body 1301 is not detected) the MPU 1100, in step S1411, moves the moving body 1301 by a low speed feed in the positive direction or by the step feed operation. Therefore, when the output of the limit detector 1306 becomes Hi-level, the process proceeds from step S1412 to step S1413, and the MPU 1100 stops the moving body 1301. After this, the operation of the above described step S1414 through step S1416 (third movement processing) is performed. If the moving body 1301 stops, its position is determined (step S1416) to be the origin point and the origin return operation or the origin point movement operation is completed.

FIG. 17 (17a) illustrates a speed plan generated by the speed plan calculation unit 1101 in a case where the output of the limit detector 1306 indicates the Hi-level, in the origin return operation/origin point movement operation explained using the flowchart of FIG. 16, after the speed of the moving body 1301 has reached vm. Also, FIG. 17 (17b) illustrates states of Hi and Low of the detection signal according to the limit detector 1306. In step S1403, the speed plan generated by the speed plan calculation unit 1101, accelerates the moving body 1301 at the acceleration α (acceleration portion 501), and after the speed the moving body 1301 has reached the vm obtained in step S1402, this speed maintains movement in the positive direction (constant speed portion 1502). The maximum speed vm is obtained in step S1402. When the moving body 1301 is detected by the limit detector 1306, the speed plan calculation unit 1101 generates a plan of a deceleration portion 1503 that decelerates at the acceleration α, to control the movement of the moving body 1301. Movement thereafter of the moving body 1301 by an acceleration portion 1501, the constant speed portion 1502, and the deceleration portion 1503 is first movement processing. Note, acceleration rate is made to be a for both the acceleration portion 1501 and the deceleration portion 1503, and it is possible to further accelerate movement to the origin point position by the maximum acceleration possible provided by the mechanical unit 1300. Alternatively, by making the acceleration rate of the deceleration portion 1503 greater than the acceleration α used for the calculation of target speed vm, it is possible to stop the moving body 1301 more reliably within the distance L0.

In the second movement processing, the speed plan calculation unit 1101 generates a speed plan making the limit detection position stored in the memory 1107 the target, and causes the moving body 1301 to move. The speed plan is comprised by an acceleration portion 1504 and a deceleration portion 1505 in a negative direction (the direction away from the mechanical limit). During this time, it is desirable to have a speed plan in which the acceleration and deceleration of the moving body 1301 is controlled so that the moving body 1301 can move in the shortest time to the detection position from the stop position.

FIG. 18 (18*a*) illustrates a speed plan of the moving body 1301 in a case where the output of the limit detector 1306 indicates the Hi-level prior to the speed of the moving body 1301 reaching vm. Also, FIG. 18 (18*b*) illustrates a state of Hi and Low of the detection signal by the limit detector 1306. In the first movement processing, the speed plan switches, in accordance with the detection signal from the limit detector 1306, from the acceleration portion 1601 in which acceleration is by the acceleration α is in positive direction to a deceleration portion 1602 in which deceleration is by the acceleration α. In the second movement processing, the speed plan calculation unit 1101 generates a speed plan making the limit detection position stored in the memory 1107 the target, and causes the moving body 1301 to move. An acceleration portion 1603 and a deceleration portion 1604 are similar to the acceleration portion 1504 and the deceleration portion 1505 described above.

Note, although the light-shielding photo-interrupter is configured for the limit detector in the above described embodiment, if a mechanism can detect that the coil unit 1312 is in a range of the distance L0 from the mechanical limit, any detector type may be used.

Next, explanation is given with reference to the flowchart of FIG. 19 for the process for, in step S1401, the MPU 1100, the limit detector 1306 detecting the moving body 1301 when an origin return operation or an origin point movement operation is instructed. In such a case, the process proceeds from step S1401 to step S1701 of FIG. 19. FIG. 19 is a flowchart for illustrating a control procedure by the MPU 1100 for a case where the output of the limit detector 1306 is the Hi-level (a case where the limit detector 1306 detects the moving body 1301) when the origin return operation and the origin point movement operation of the mechanical unit 1300 are instructed.

The MPU 1100, in step S1701 through step S1709 executes a fourth movement processing. In the fourth movement processing, the MPU 1100, in a direction away from the position of the movement limit, initiates a movement of the moving body so as to move the distance L0 from a current position, and stops the moving body 1301
  in accordance with the movement of the distance L0 completing in the state in which the limit detector 1306 is detecting the moving body 1301, or
  in accordance with the limit detector 1306 ceasing to be able to detect the moving body 1301 prior to the movement of the distance L0 completing.

In other words, in step S1701, the MPU 1100 sets a position, for which the distance L0 which is set beforehand (refer to FIG. 15 (15*a*)) is subtracted from the current position, to the target position. Thus, in step S1702, the speed plan calculation unit 1101 creates a speed plan (acceleration and deceleration plan) from the acceleration α. Note, the speed plan calculation unit 1101, determines the speed pattern based on the parameters which are calculated as moving distance Ptgt=Pnow−L0, target speed v2=sqrt(Ptgt× α), and the acceleration α.

Thus, in step S1703, the speed plan calculation unit 1101, in accordance with the speed plan generated, moves the moving body 1301 in the negative direction. During this movement, specifically when the output of the limit detector 1306 becomes Low-level before reaching the target position, the process proceeds to step S1706 via step S1704 (NO) and step S1705 (NO). In other words, the MPU 1100 with an edge (falling edge) of the output of the detection signal of the limit detector 1306 as a trigger, and the process proceeds to step S1706. In step S1706, the MPU 1100 stores to the memory 1107 as the detection position Plim a current position Pnow which is measured consecutively by the sensor unit 1311 and the scale pattern 1316 obtained from the position signal processing unit 1104. After this, if the moving body 1301 is in a deceleration operation, the process proceeds from step S1707 to step S1709, and the moving body 1301 is stopped by continuing to decelerate with a negative acceleration α. If not, the process proceeds from step S1707 to step S1708, a deceleration operation at a negative acceleration α is forcibly performed to stoppage (step S1709). Also, when the fourth movement processing is completed by the moving body 1301 reaching the target position set in step S1701, the process proceeds from step S1704 to step S1712.

Next, explanation is given for a case in which the fourth movement processing (step S1701 through step S1709) completes in the stoppage of step S1709 via step S1706- S1708, where prior to the moving body 1301 moving the distance L0 (NO in step S1704) the trailing edge of the detection signal from the limit detector 1306 is detected (step S1705 changes to NO). In such a case, the MPU 1100 executes fifth movement processing (step S1710 through step S1711) for moving the moving body 1301 in a direction approaching the limit position (the mechanical limit) until the limit detector 1306 can limit detect the position. In other words, in step S1710, the speed plan calculation unit 1101 generates a speed plan for moving from the current position Pnow to the detection position Plim stored in the memory 1107, and moving the moving body 1301 with the detection position Plim as a target value in step S1711. The speed plan is generated based on parameters calculated by moving distance=|Pnow−Plim|, target speed v3=sqrt (Pm×α) and the acceleration α. When the fifth movement processing is completed, the process proceeds to step S1712, and the MPU 1100 confirms the existence or absence of the limit detection.

Meanwhile, in step S1705, in a case when the moving body 1301 reaches the target position set in step S1701 before the output of the limit detector 1306 becomes Low-level, YES is determined in step S1704. In such a case, the MPU 1100 completes the fourth movement processing and the process proceeds from step S1704 to step S1712.

In step S1712, in the case of YES, in other words, when the limit detector 1306 detects the moving body 1301, the process proceeds to sixth movement processing (step S1716 through step S1718). In the sixth movement processing, the MPU 1100 performs stoppage (step S1718) by performing movement with a low speed feed or a step feed (step S1716) until the moving body 1301 cannot be detected by the limit detector 1306, in other words, until step S1717 becomes NO.

Meanwhile, in a case when the result of the fourth movement processing or the fifth movement processing is that the moving body 1301 is not detected by the limit detector 1306 (NO in step S1712), the process proceeds to step S1713. In such a case, the MPU 1100 first moves the moving body 1301 at a low speed feed or step feed operation in the direction (the positive direction) of the limit detector 1306 (step S1713). Thus, if the output of the limit detector 1306 becomes Hi-level (YES in step S1714), the MPU 1100 stops movement of the moving body 1301 (step S1715). Thus, the MPU 1100 executes the sixth movement processing as described above (step S1716 through step S1718). In other words, the MPU 1100, in a direction of the moving body 1301 away from the position (the mechanical limit) of the movement limit, causes the moving body to move by a low speed feed or a step feed (step S1716). Thus, the MPU 1100 causes the moving body 1301 to stop at a position (NO in step S1717) at which the limit detector 1306 ceases to be able to detect the moving body 1301 (step S1718). Note, the process of step S1716 is similar to step S1414.

The MPU 1100 determines the position at which the moving body 1301 stopped in step S1718 to be the origin point (step S1719), and completes an origin return operation and an origin point movement operation.

FIG. 20 (20a) is a view illustrating a state of controlling the moving body 1301 based on the speed plan generated by the speed plan calculation unit 1101 of the MPU 1100 in an origin return operation/an origin point movement operation explained using the flowchart of FIG. 19. Also, FIG. 20 (20b) illustrates a state of Hi and Low of the detection signal according to the limit detector 1306. In an acceleration portion 1801, the MPU 1100 moves the moving body 1301 at the acceleration α in the negative direction which is a direction away from the mechanical limit (step S1703). When the detection signal of the limit detector 1306 switches to Low before completing the movement of the distance L0, the MPU 1100 decelerates (the deceleration portion 1802, step S1708) and stops the movement of the moving body 1301 (step S1709). After this, the MPU 1100 moves the moving body 1301 to the limit detection position (step S1710, step S1711). At that time, the speed plan of the moving body 1301 is like that of an acceleration portion 1803 in the positive direction and a deceleration portion 1804 when moving in a positive direction. When the movement of the moving body 1301 according to the acceleration portion 1803 and the deceleration portion 1804 completes, as explained in step S1712 through step S1718, the moving body 1301 moves to a precise origin point position by the low speed or step feed.

FIG. 21 (21a) is, in step S1701 through step S1705, is a figure that illustrates a speed plan in a case when the moving body 1301 reaches the target position (Ptgt) set in step S1701. Also, FIG. 21 (21b) illustrates a state of Hi and Low of the detection signal by the limit detector 1306. When the moving body 1301 is stopped via a deceleration portion 1902 at a time of movement in the negative direction, and an acceleration unit 1901 during movement in the negative direction, the MPU 1100, as explained in step S1712 through step S1718, by the low speed or step feed, moves the moving body 1301 to a precise origin point position. Note, in FIG. 21 (21a), a state in which the limit detector 1306 is detecting the moving body 1301 when the moving body 1301 is stopped via the deceleration portion 1902 is illustrated. This is a case when the moving body 1301 is very close to the mechanical limit, and a case when the limit detection position is positioned at a position slightly longer than L0 (an error at a time of manufacture). In such a case, in a time period 1903 (shown longer than it actually is), the MPU 1100 low speed feeds or step feeds the moving body 1301 in the positive direction, switches the detection signal of the limit detector 1306 from Hi to Low, and determines the position of the moving body 1301 to be the origin point position.

Note, although the limit detectors 1306 and 1307 use a photo-interrupter in the above described embodiment, if a mechanism can detect the distance between the coil unit 1312 and the mechanical limit, a limit detector and guidance type sensor may be used. Also, although the stage apparatus of a single axis is illustrated above, it goes without saying that the above described configuration can be applied to each axis of the stage apparatus of two axes.

Also, the stage apparatus described above can be applied to respective devices that require positioning. For example, it can be used as a stage of a microscope that places an observation target and moves to change an observable area.

As explained above, in accordance with the stage apparatus of the present embodiment, by performing an appropriate speed setting in the origin return, a destruction of mechanical precision by contacting the mechanical limit of the moving body is prevented, and also, it is possible for the origin return and the origin point movement to be performed in a short duration. Also, even in a case when the origin point is made to be the detection point of the limit detector, it is possible to perform the origin return operation and the origin point movement operation at high speed without the moving body contacting the mechanical limit with fewer sensors.

In addition, by virtue of the second embodiment, it is possible to determine a position of a moving body at high speed by using a sensor that restricts a movement range of the moving body.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-094441, filed May 1, 2015 and Japanese Patent Application No. 2015-094443, filed May 1, 2015, which are hereby incorporated by reference herein in their entirety.

The invention claimed is:

1. A stage apparatus, comprising:
an incremental scale fixed to a movable unit and having a predetermined length shorter than a distance the movable unit can move in a first direction as a movable range;
first and a second sensors which read the scale and that are arranged in the first direction with an interval therebetween shorter than the predetermined length, wherein the first and second sensors obtain information on movement of the movable unit in the first direction;
a detection unit configured to detect that the movable unit has reached an origin point position set in the movable range; and
a movement control unit configured to perform an origin return that moves the movable unit to the origin point position,
wherein, if the movable unit is at a position at which both the first sensor and the second sensor can read the scale, the movement control unit executes, in the origin return, a first movement that causes the movable unit to move a predetermined distance toward the origin point position, and, after the first movement, when the first sensor reads the scale and the second sensor does not read the scale, a second movement that causes the movable unit to move at a lower speed than the first movement until the detection unit detects that the movable unit has reached the origin point position.

2. The apparatus according to claim 1, wherein
the first sensor is arranged closer to the origin point position than the second sensor, and
the movement control unit executes the first movement by reading the scale by the first sensor.

3. The apparatus according to claim 2, wherein
if the second sensor can read the scale but the first sensor cannot read the scale, the movement control unit executes a third movement that moves the movable unit toward the origin point position, and executes the first movement when the movable unit comes to a position at which the scale can be read by both of the first sensor and the second sensor.

4. The apparatus according to claim 3, wherein a speed of the third movement is a speed in the first movement.

5. The apparatus according to claim 2, wherein, if the first sensor, when starting the origin return, can read the scale but the second sensor cannot read the scale, the movement control unit executes a fourth movement that moves the movable unit in an opposite direction to the origin point position, and executes the first movement when the movable unit comes to a position at which the scale can be read by both of the first sensor and the second sensor.

6. The apparatus according to claim 1, wherein, after causing the movable unit to move toward the origin point position, the movement control unit manages the position of the movable unit while the first sensor and the second sensor can read the scale, by performing a handover of reading of the scale between the first sensor and the second sensor.

7. The apparatus according to claim 1, wherein the movement control unit executes the origin return at a time of power activation.

8. The apparatus according to claim 1, wherein the movement control unit executes the origin return if a value of the scale read by the first sensor or the second sensor enters a reset state.

9. The apparatus according to claim 1, further comprising:
a position signal processing circuit for processing signals from the first and second sensors and generating a position signal,
wherein the movement control unit is implemented by an MPU (Micro-Processing Unit) executing a program, and obtains the position of the movable unit from the position signal processing circuit.

10. The apparatus according to claim 1, further comprising:
an AD converter configured to convert signals from the first and second sensors into digital signals,
wherein the movement control unit is implemented by an MPU (Micro-Processing Unit) executing a program, and obtains the position of the movable unit from the conversion unit.

11. A method of controlling a stage apparatus,
the stage apparatus comprising:
an incremental scale fixed to a movable unit and having a predetermined length shorter than a distance the movable unit can move in a first direction as a movable range;
first and a second sensors which read the scale and that are arranged in the first direction with an interval therebetween shorter than the predetermined length, wherein the first and second sensors obtain information on movement of the movable unit in the first direction; and
a detection unit configured to detect that the movable unit has reached an origin point position set in the movable range of the movable unit,
the method comprising:
in an origin return that moves the movable unit to the origin point position, performing a first movement, if the movable unit is at a position at which both the first sensor and the second sensor can read the scale, in which the movable unit is caused to move a predetermined distance toward the origin point position; and
performing a second movement, after the first movement, when the first sensor reads the scale and the second sensor does not read the scale, in which the movable unit is caused to move at a lower speed than in the first movement until the detection unit detects that the movable unit has reached the origin point position.

12. A non-transitory computer readable storage medium storing a program for causing a computer for controlling a stage apparatus, the stage apparatus comprising:
an incremental scale fixed to a movable unit and having a predetermined length shorter than a distance the movable unit can move in a first direction as a movable range;
first and a second sensors which read the scale that are arranged in the first direction with an interval therebetween shorter than the predetermined length, wherein the first and second sensors obtain information on movement of the movable unit in the first direction; and
a detection unit configured to detect that the movable unit has reached an origin point position set in the movable range of the movable unit,
the program comprising computer executable code to execute:
in an origin return that moves the movable unit to the origin point position, performing a first movement, if the movable unit is at a position at which both the first sensor and the second sensor can read the scale, in which the movable unit is caused to move a predetermined distance toward the origin point position; and performing a second movement, after the first movement, when the first sensor reads the scale and the second sensor does not read the scale, in which the movable unit is caused to move at a lower speed than in the first movement until the detection unit detects that the movable unit has reached the origin point position.

13. A microscope system comprising a stage apparatus as a stage for placing a slide, wherein the stage apparatus comprises:
- an incremental scale fixed to a movable unit and having a predetermined length shorter than a distance the movable unit can move in a first direction as a movable range;
- first and second sensors which read the scale and that are arranged in the first direction with an interval therebetween shorter than the predetermined length, wherein the first and second sensors obtain information on movement of the movable unit in the first direction;
- a detection unit configured to detect that the movable unit has reached an origin point position set in the movable range; and
- a movement control unit configured to perform an origin return that moves the movable unit to the origin point position,
- wherein, if the movable unit is at a position at which both the first sensor and the second sensor can read the scale, the movement control unit executes, in the origin return, a first movement that causes the movable unit to move a predetermined distance toward the origin point position, and, after the first movement, when the first sensor reads the scale and the second sensor does not read the scale, a second movement that causes the movable unit to move at a lower speed than the first movement until the detection unit detects that the movable unit has reached the origin point position.

14. A microscope system, comprising:
- a microscope body;
- a stage that places a slide which is an observation target, and that is mounted on the microscope body, and that has an XY-stage that moves in an X direction and a Y direction that are orthogonal to each other;
- an XY scale plate that is fixed to the XY-stage and that has an incremental scale having a predetermined length shorter than a distance the XY-stage can move in each of the X direction and the Y direction as a movable range; and
- for each of the X direction and the Y direction, the microscope system comprises:
- first and second sensors which read for reading the scale and that are arranged with an interval therebetween shorter than the predetermined length, wherein the first and second sensors obtain information on movement of the XY-stage in the first direction;
- a detection unit configured to detect that the XY-stage has reached an origin point position set in the movable range of the XY-stage; and
- a movement control unit configured to, if the XY-stage is at a position at which both the first sensor and the second sensor can read the scale, execute, in an origin return that moves the XY-stage to the origin point position, a first movement that causes the XY-stage to move a predetermined distance toward the origin point position, and, after the first movement, when the first sensor reads the scale and the second sensor does not read the scale, a second movement that causes the XY-stage to move at a lower speed than the first movement until the detection unit detects that the XY-stage has reached the origin point position.

* * * * *